(12) United States Patent
Gu

(10) Patent No.: US 6,624,939 B2
(45) Date of Patent: Sep. 23, 2003

(54) 50/100 AND 50/200 GHZ DE-INTERLEAVER WITH HIGH ISOLATION AND DISPERSION COMPENSATION

(75) Inventor: Shijie Gu, Sunnyvale, CA (US)

(73) Assignee: Oplink Communications, Inc., San Jose, CA (US)

(*) Notice: Subject to any disclaimer, the term of this patent is extended or adjusted under 35 U.S.C. 154(b) by 11 days.

(21) Appl. No.: 09/998,482

(22) Filed: Nov. 29, 2001

(65) Prior Publication Data

US 2003/0103265 A1 Jun. 5, 2003

(51) Int. Cl.[7] .............................................. G02B 27/28
(52) U.S. Cl. .................. 359/498; 359/497; 359/122; 359/124; 359/577
(58) Field of Search ............................. 359/484, 494, 359/495, 497, 498, 122, 124, 577; 356/491

(56) References Cited

U.S. PATENT DOCUMENTS

| | | | |
|---|---|---|---|
| 6,169,604 B1 | 1/2001 | Cao | 356/519 |
| 6,169,626 B1 | 1/2001 | Chen et al. | 359/279 |
| 6,493,141 B2 * | 12/2002 | Cao et al. | 359/497 |
| 2002/0196540 A1 * | 12/2002 | Zhao | 359/495 |

* cited by examiner

Primary Examiner—Mark A. Robinson
Assistant Examiner—Lee Fineman
(74) Attorney, Agent, or Firm—Lumen Intellectual Property Services

(57) ABSTRACT

An optical de-interleaver for de-interleaving light beams of odd and even channel signals having channel spacing S into light beams of odd channel signals having channel spacing 2S and light beams of even channel signals having channel spacing 2S is provided which has only one polarization interferometer and one optical dispersion compersator. A 50/100 GHz de-interleaver and a 50/200 GHz de-interleaver with high isolation and dispersion compensation are provided by applying this unique arrangement. The optical de-interleaver has a 0.5 dB passband width of about 30 GHz and a −25 dB isolation stopband width of about 30 GHz.

15 Claims, 21 Drawing Sheets

50/100 AND 50/200 GHZ DE-INTERLEAVER WITH HIGH ISOLATION AND DISPERSION COMPENSATION

FIELD OF THE INVENTION

The present invention relates generally to fiber optic communication system, and in particular to an optical de-interleaver for de-multiplexing optical signals.

BACKGROUND OF THE INVENTION

Fiber optic communications are becoming increasingly popular for data transmission due to their high speed and high data capacity capabilities. In order to reduce cost and the amount of time required to provide the increased capacity, wavelength division multiplexing (WDM) and dense wavelength division multiplexing (DWDM) have been developed, which can provide increased capacity without requiring new fiber optic cables.

Another approach to increasing fiber optic capacity is to use more closely spaced channels. An interleaver is essentially an optical router that allows existing DWDM filters designed for operation at wide channel spacing to be extended to system designs with narrow channel spacing, in the range of 50 GHz or even less. An interleaver combines two sets of channels into one densely packed set with half the channel spacing. Inversely an optical de-interleaver routes the single input set of channels into two output streams with double channel spacing. The general principal behind an interleaver/de-interleaver is an interferometric overlap of two light beams. The interference creates a periodic, repeating output as different integral multiples of wavelengths pass through the device. The desired channel spacings of a device are set by controlling the fringe pattern. Methods using fused-fiber Mach-Zehnder interferometer, Michelson interferometer, liquid crystals, birefringent crystals, Gires-Tournois interferometer (GTI) and other approaches are developed to build interleavers/de-interleavers.

U.S. Pat. No. 6,169,626 discloses an (100/200 GHz or 50/100 GHz) interleaver/de-interleaver that includes an unequal path Michelson interferometer to provide a linear phase response and a second non-linear interferometer (a Fabry-Perot Phase Shifter) to provide a non-linear phase response with slight attenuation. U.S. Pat. No. 6,169,604 discloses an optical de-interleaver that includes two non-linear interferometers (NLI). Each of the non-linear interferometers is a Gires-Tournois Interferometer (GTI) with an internal λ/4 wave-plate and an external λ/8 wave-plate.

For DWDM applications, there is a need to cascade two or more de-interleavers with different channel spacings. For example, cascading one 50/100 GHz de-interleaver and two 100/200 GHz de-interleavers to create a 50/200 GHz de-interleaver. The market of DWDM demands that a de-interleaver generally has output channel spacings that are 4 times, even 8 times of the input channel spacing.

U.S. Pat. No. 6,169,626 also discloses a 50/200 GHz de-interleaver which is cascaded by one 50/100 GHz de-interleaver and two 100/200 GHz de-interleavers. Optical fibers are used in this system to connect between the 50/100 GHz de-interleaver and two 100/200 GHz de-interleavers. However, simply cascading several de-interleavers together leads to substantially larger system size, high insertion loss and more optical components. Therefore there is a need to create an integral device as a de-interleaver having output channel spacings that are 4 times, even 8 times of the input channel spacing.

A Gires-Tournois Interferometer (GTI) based interleaver/de-interleaver has following advantages:
very low insertion loss;
uniform response over a wide wavelength range (flat-top spectrum); and
minimal polarization dependence effect.

However, relatively larger chromatic dispersion becomes the major disadvantage of a Gires-Tournois Interferometer (GTI) based interleaver/de-interleaver.

For a 100/200 GHz optical de-interleaver, the input channel spacing is 100 GHz. The typical insertion loss is about 1 dB and the maximum insertion loss is about 1.5 dB. The 0.5 dB passband width and −25 dB (isolation) stopband width are not less than 27.5 GHz. The absolute value of the chromatic dispersion is not larger than 30 ps/nm. The specifications of a 200/100 GHz interleaver are the same as those of a de-interlesver, except for the isolation. For an interleaver, −15 dB isolation is sufficient.

When the fiber optic communications require higher data capacity, an optic fiber needs to transmit more channels in the same bandwidth, this means that the channel spacing of an interleaver/de-interleaver is getting narrower, i.e. 50/100 GHz, even 25/50 GHz. In order to retain high speed data transmission of 10 Gbit/sec, the required specifications of an interleaver/de-interleavers with the narrower channel spacing are almost the same as that of a an interleaver/de-interleavers with wider channel spacing. The fact is that when the channel spacing of an interleaver/de-interleavers is reduced to half, the passband and stopband widths are also reduced to half, and the chromatic dispersion values increase to 4 times. Therefore, there exists a need for an approach that allows a de-interleaver with narrower channel spacing to have a wider stopband width and a smaller dispersion value.

In co-pending U.S. patent application Ser. No. 09/929, 875, entitled "Gires-Tournois Interferometer with Faraday Rotator for Optical Signal Interleaver", the inventor of the present application discloses a Gires-Tournois Interferometer (GTI) with Faraday rotator (GTIFR) for use in an interleaver or a de-interleaver. A dispersion compensated GTIFR interleaver/de-interleaver is also disclosed in this co-pending patent application, which includes a second GTI for providing chromatic dispersion compensation. The absolute value of dispersion of the compensated device can reach as lower as only about 12% of that of an un-compensated device.

In another co-pending U.S. Patent Application entitled "De-Interleaver with high Isolation and Dispersion Compensation, and 50/200 GHz Interleaver and De-Interleaver", the inventor of the present application discloses a polarization interferometer based 50/100 GHz de-interleaver with high isolation (the −25 dB stopband width is about 30 GHz) and dispersion compensation (the absolute value of dispersion is not larger than 24 ps/nm) Three polarization interferometers are used in this 50/100 GHz de-interleaver with high isolation and dispersion compensation. The inventor of the present application also discloses an integral 50/200 GHz de-interleaver with dispersion compensation in this co-pending patent application. In this 50/200 GHz de-interleaver, three polarization interferometers are used and the (−25 dB isolation) stopband widths for the 50 GHz adjacent channels are 18.8 GHz.

In view of the above, it would be an advance in the art to provide a S/2S GHz de-interleaver with high isolation and dispersion compensation, which includes only one polarization interferometer. It would be an especially welcome advance to provide an integral de-interleaver, e.g. a S/4S GHz de-interleaver, with less optical components, lower cost, higher isolation (wider stopband) and lower dispersion for DWDM applications. Here S represents the channel spacing of an input beam, e.g. S=50 GHz.

OBJECTS AND ADVANTAGES

It is a primary object of the present invention to provide a S/2S optical de-interleaver, e.g. an 50/100 GHz optical de-interleaver, with high isolation and dispersion compensation, which has only one Polarization Interferometer.

It is a further object of the present invention to provide a S/4S optical de-interleaver, e.g. a 50/200 GHz de-interleaver, with less optical components, lower cost, higher isolation (wider stopband) and lower dispersion.

These and numerous other objects and advantages of the present invention will become apparent upon reading the detailed description.

SUMMARY

In accordance with the present invention, an optical de-interleaver for de-interleaving an input beam of odd and even channel signals having channel spacing S into a first output beam of odd channel signals having channel spacing 2S and a second output beam of even channel signals having channel spacing 2S is provided which has only one polarization interferometer.

The optical de-interleaver has a first port for introducing the input light beam to provide two linearly polarized beams of odd and even channel signals having channel spacing S. The two linearly polarized beams of odd and even channel signals go through a polarization interferometer and are split by a polarization beam splitter into two linearly polarized beams of odd channel signals having channel spacing 2S and two linearly polarized beams of even channel signals having channel spacing 2S.

The two linearly polarized beams of odd channel signals are reflected by a first reflector, go through the polarization interferometer again and are received by a second port to provide the first output beam of odd channel signals having channel spacing 2S. The two linearly polarized beams of even channel signals are reflected by a second reflector, go through the polarization interferometer again and are received by a third port to provide the second output beam of even channel signals having channel spacing 2S.

The optical de-interleaver of the present invention further has an optical dispersion compensator disposed after the first port. The optical dispersion compensator can be a Gires-Tournois Interferometer (GTI). The polarization interferometer of the present invention can have a Gires-Tournois Interferometer (GTI) with an internal phase element and an external phase element.

The channel spacing S can be selected from a group consisting of 12.5 GHz, 25 GHz, 50 GHz and 100 GHz. The 50/100 GHz optical de-interleaver of the present invention has a 0.5 dB passband width of about 30 GHz, a −25 dB isolation stopband width of about 30 GHz and an absolute dispersion value of less than 24 ps/nm.

In accordance with the present invention, there is further provided an optical de-interleaver for de-interleaving an input beam of odd-odd, odd-even, even-odd and even-even channel signals having channel spacing S into a first output beam of odd-odd channel signals having channel spacing 4S, a second output beams of odd-even channel signals having channel spacing 4S, a third output beam of even-old channel signals having channel spacing 4S, and a fourth beam of even-even channel signals having channel spacing 4S.

The optical de-interleaver has a first port for introducing the input beam to provide two linearly polarized beams of odd-odd, odd-even, even-odd and even-even channel signals having channel spacing S. The two linearly polarized beams of odd-odd, odd-even, even-odd and even-even channel signals go through a first polarization interferometer and are split by a first polarization beam splitter into two linearly polarized beams of odd-odd and odd-even channel signals having channel spacing 2S and two linearly polarized beams of even-odd and even-even channel signals having channel spacing 2S.

The two linearly polarized beams of odd-odd and odd-even channel signals are reflected by a first reflector, go through the first polarization interferometer again and go through a second polarization interferometer. The two linearly polarized beams of even-odd and even-even channel signals are reflected by a second reflector, go through the first polarization interferometer again and go through a third polarization interferometer.

A second polarization beam splitter splits the two linearly polarized beams of odd-odd and odd-even channel signals after going through the second polarization interferometer into two linearly polarized beams of odd-odd channel signals having channel spacing 4S and two linearly polarized beams of odd-even channel signals having channel spacing 4S. The two linearly polarized beams of odd-odd channel signals are received by a second port to provide the first output beam. The two linearly polarized beams of odd-even channel signals are received by a third port to provide the second output beam.

A third polarization beam splitter splits the two linearly polarized beams of even-old and even-even channel signals after going through the third polarization interferometer into two linearly polarized beams of even-old channel signals having channel spacing 4S and two linearly polarized beams of even-even channel signals having channel spacing 4S. The two linearly polarized beams of even-old channel signals are received by a fourth port to provide the third output beam. The two linearly polarized beams of even-even channel signals are received by a fifth port to provide the fourth output beam.

The optical de-interleaver of the present invention further has an optical dispersion compensator disposed after the first port. The optical dispersion compensator can be a Gires-Tournois Interferometer (GTI). Each of the first polarization interferometer, the second polarization interferometer and the third polarization interferometer can have a Gires-Tournois Interferometer (GTI) with an internal phase element and an external phase element.

The channel spacing S can be selected from a group consisting of 12.5 GHz, 25 GHz, 50 GHz and 100 GHz. The 50/200 GHz optical de-interleaver of the present invention has a 0.5 dB passband width of about 30 GHz, a −25 dB isolation stopband width of about 30 GHz and an absolute dispersion value of less than 24 ps/nm.

It is apparent to those skilled in the art that each optical de-interleaver provided in the present application can be inversely used and can be readily converted into a corresponding optical interleaver.

The above summary of the present invention is not intended to describe each disclosed embodiment or every implementation of the present invention. The figures and the detailed description will more particularly exemplify these embodiments.

BREIF DESCRIPTION OF THE FIGURES

Figure 16:
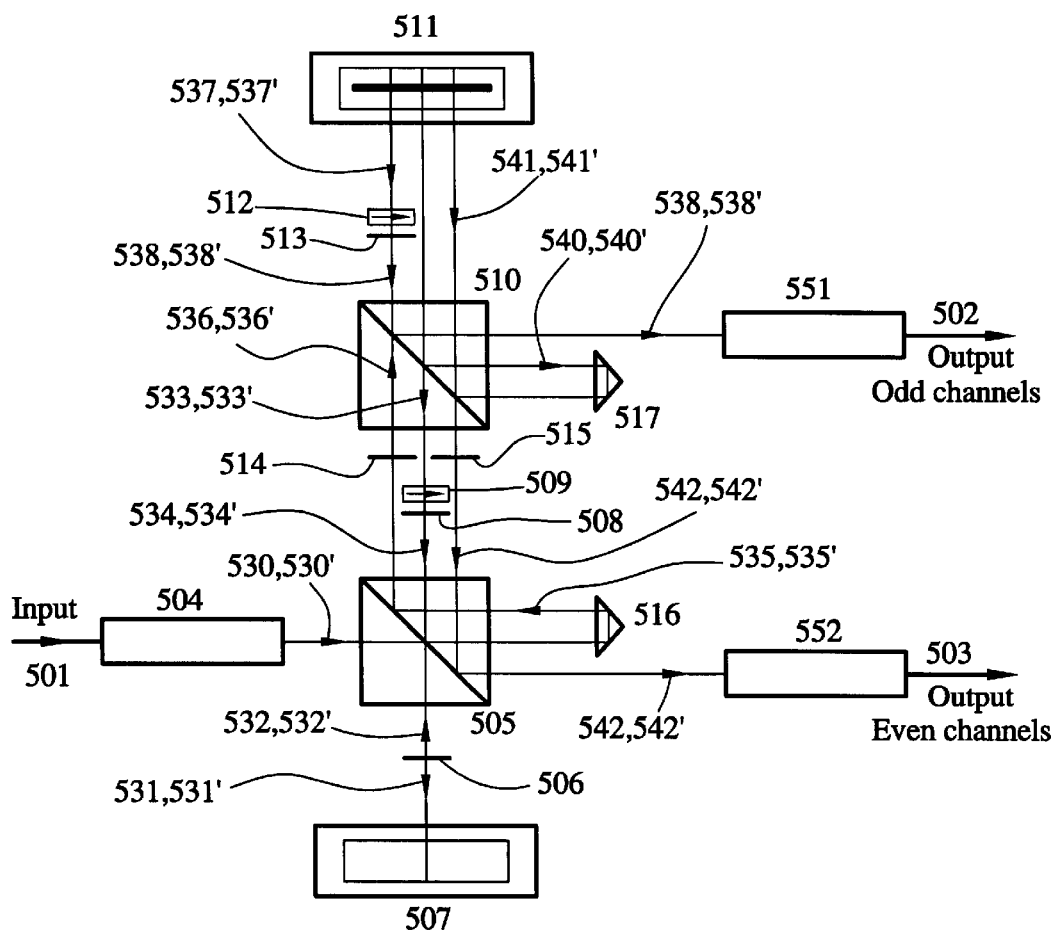
FIG. 16 shows an embodiment of a 50/100 GHz de-interleaver with high isolation and dispersion compensation of the present invention.
Figure 17A:
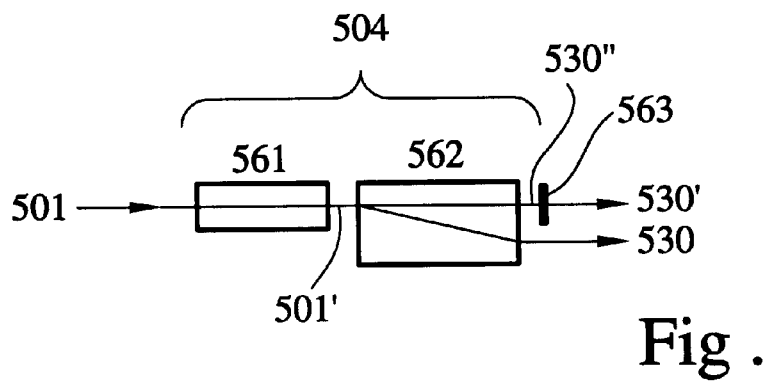
Figure 17B:
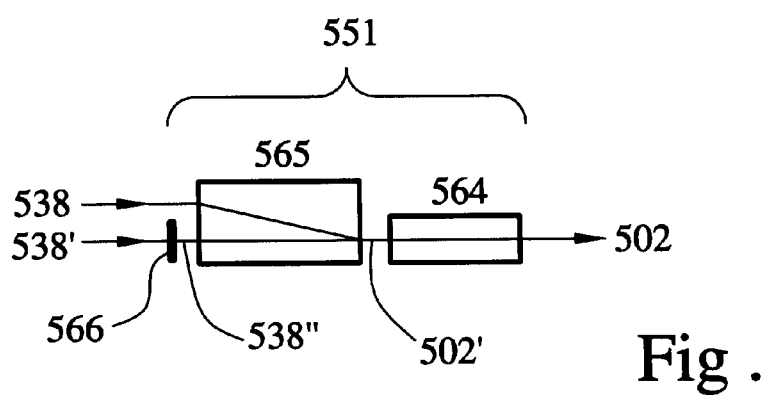
Figure 17C:
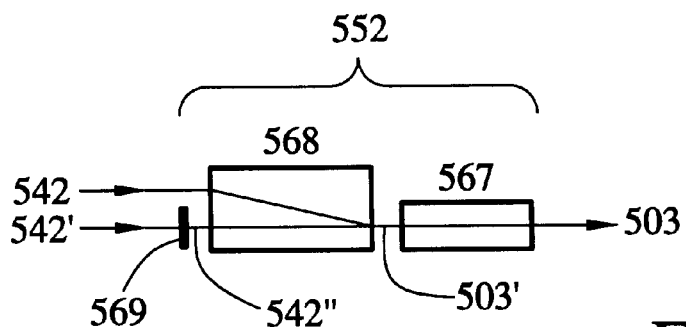
Figure 18:
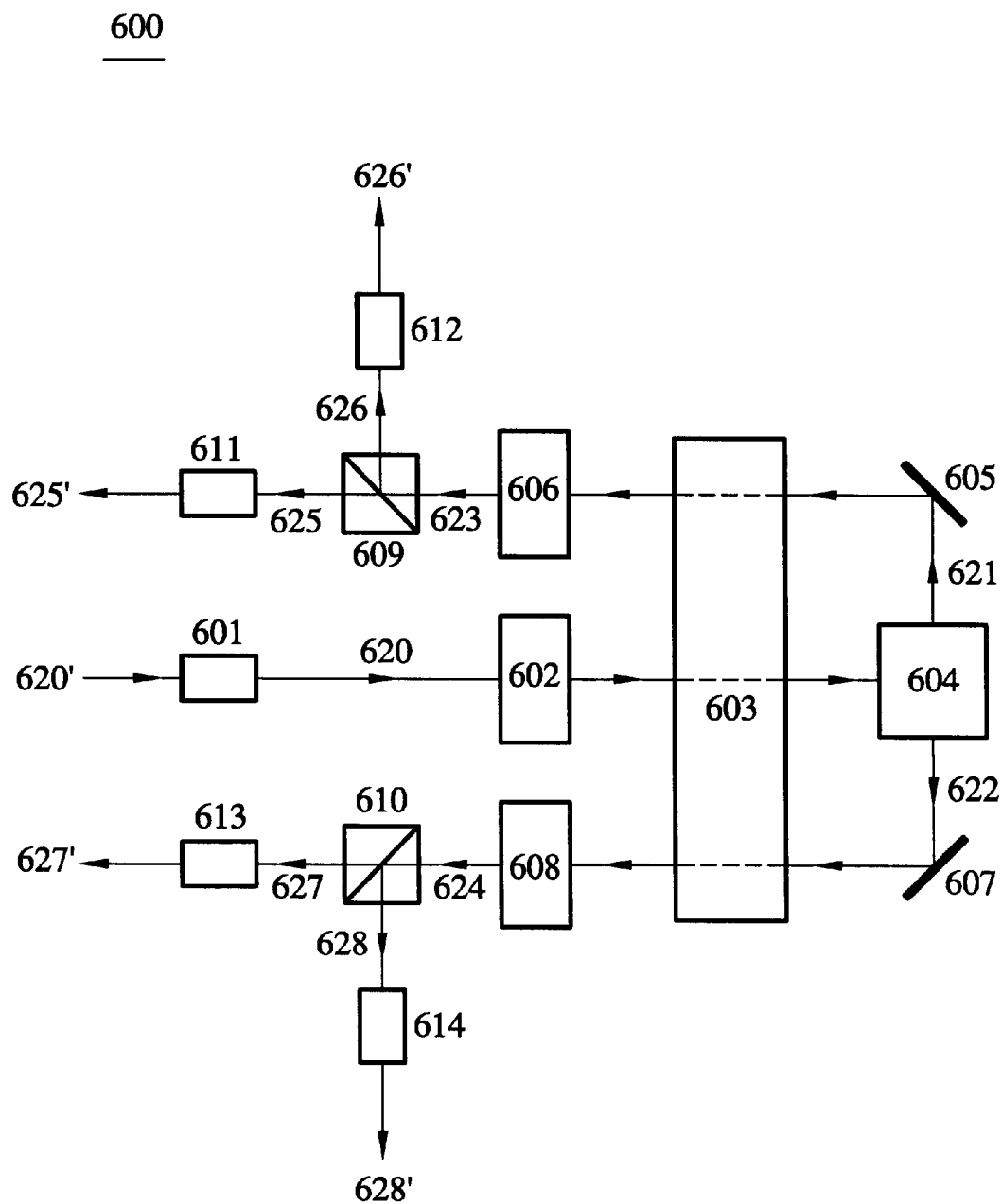
Figure 19:
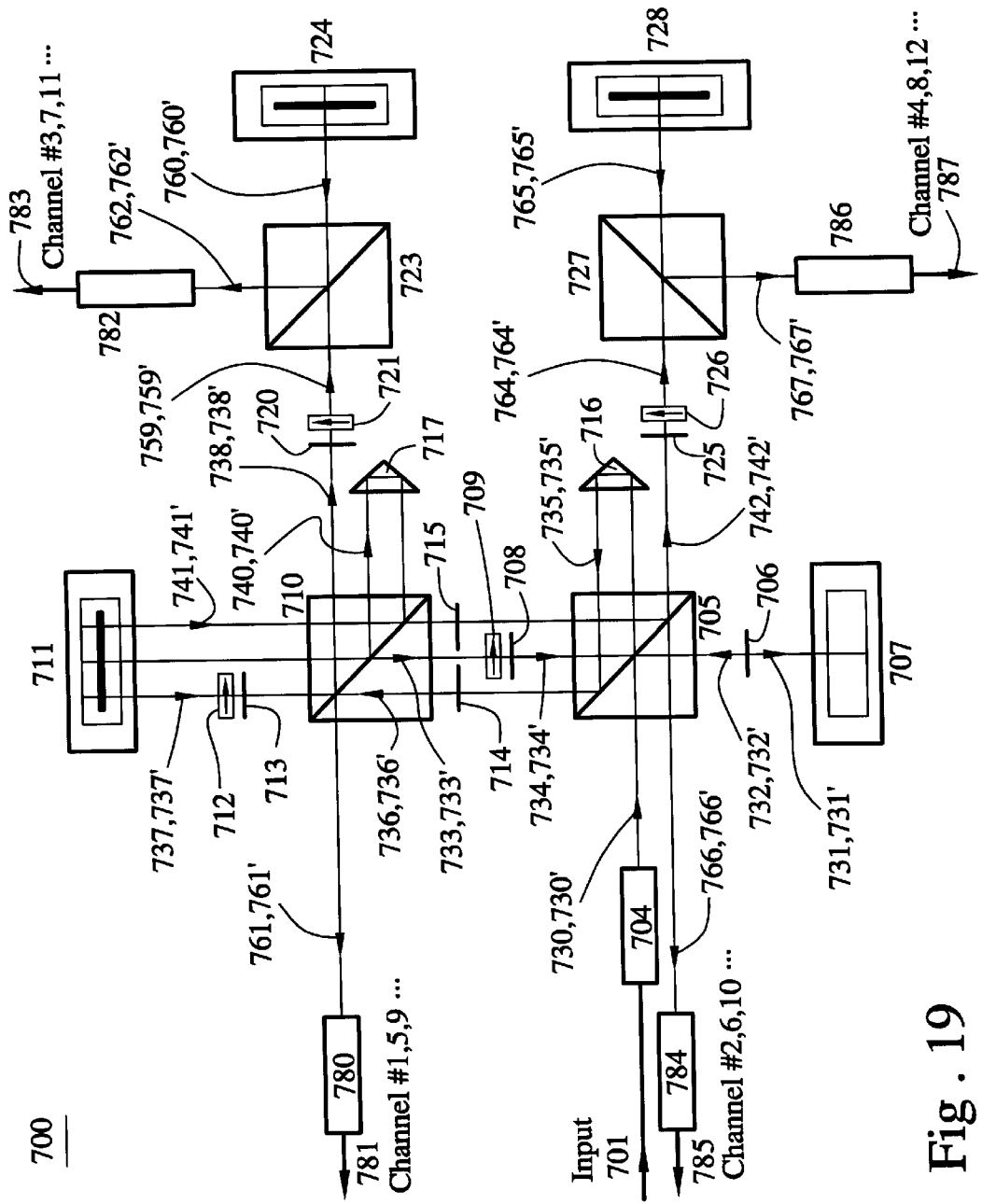
Figure 21A:
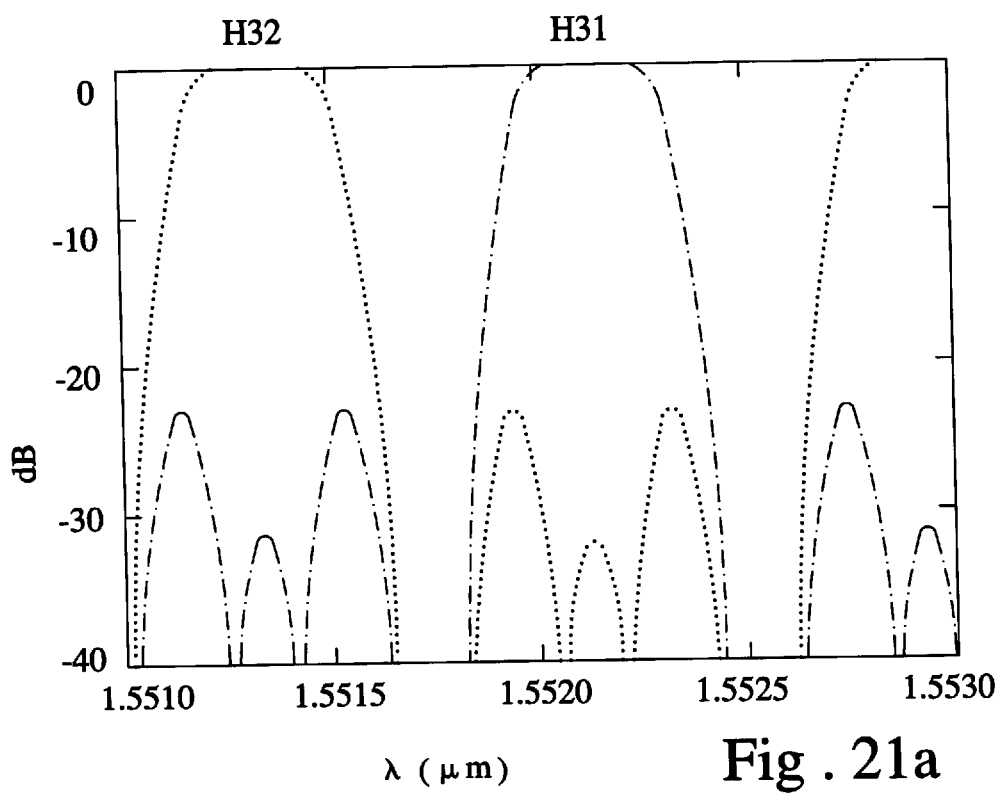
Figure 21B:
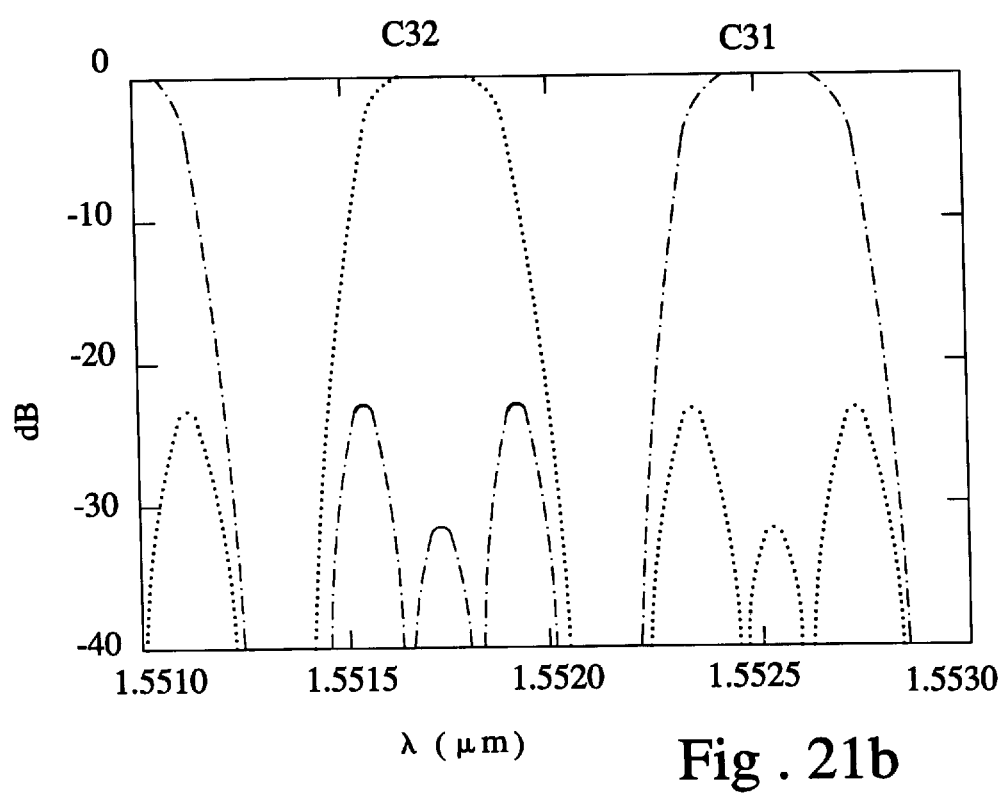

FIGS. 17a–c shows the detailed views of the three ports of the 50/100 GHz de-interleaver shown in FIG. 16;

FIG. 18 is a schematic illustration of a S/4S optical de-interleaver with high isolation and dispersion compensation of the present invention;

FIG. 19 shows an embodiment of a 50/200 GHz de-interleaver with high isolation and dispersion compensation of the present invention;

FIGS. 20a–e shows the detailed views of the five ports of the 50/200GHz de-interleaver shown in FIG. 19;

FIG. 21a illustrate the output spectrum of the 50/200 GHz de-interleaver shown in FIG. 19; and FIG. 21b illustrate the output spectrum of the 50/200 GHz de-interleaver shown in FIG. 19.

While the invention is amenable to various modifications and alternative forms, specifies thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Figure 1:
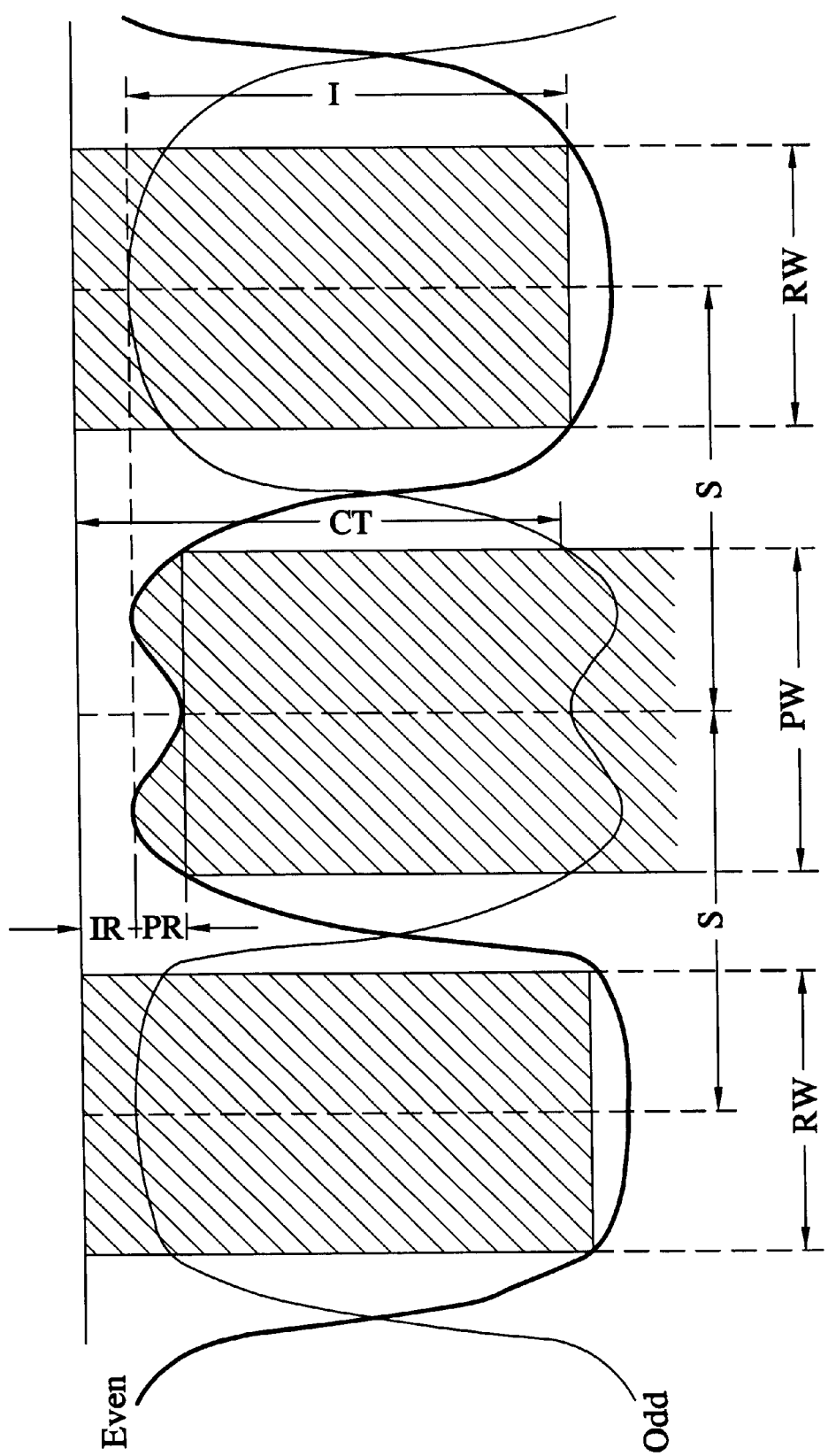
FIG. 1 illustrates the passband and characteristics of a 100/200 GHz de-interleaver.

FIG. 1 illustrates the passband and characteristics of a 100/200 GHz de-interleaver. The meanings and values of symbols used in FIG. 1 are summarized in Table 1 below.

TABLE 1

| Optical Parameter | Symbol | Min. | Typical | Max. | Units |
|---|---|---|---|---|---|
| Insertion Loss | IL | | 1.0 | 1.5 | dB |
| Passband Ripple | PR | | 0.25 | 0.5 | dB |
| Crosstalk | CT | | | −25 | dB |
| Isolation | I | | | −25 | dB |
| 0.5 dB Passband width | PW | 27.5 | | | GHz |
| Rejection Width | RW | 27.5 | | | GHz |
| Channel Spacing | S | | 100 | | GHZ |

The input channel spacing of a 100/200 GHz de-interleaver is 100 GHz. The typical insertion loss is 1 dB and the maximum insertion loss is 1.5 dB. The 0.5 dB passband width and −25 dB (isolation) stopband width are not less than 27.5 GHz. The absolute value of the chromatic dispersion is not larger than 30 ps/nm. The specifications of a 200/100 GHz interleaver are the same as those of a de-interlesver, except for the isolation. For an interleaver, −15 dB isolation is sufficient.

Figure 2:
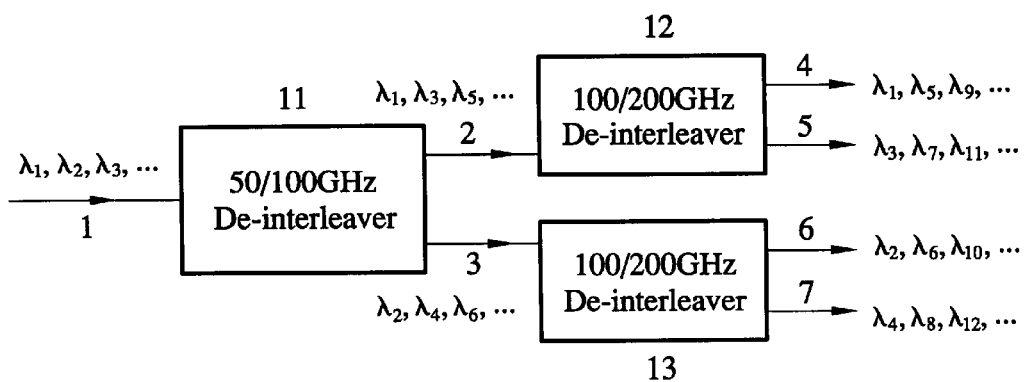
FIG. 2 is a schematic illustration of cascading a 50/100 GHz de-interleaver and two 100/200 GHz de-interleavers to create a 50/200 de-interleaver.

FIG. 2 is a schematic illustration of cascading a 50/100 GHz de-interleaver and two 100/200 GHz de-interleavers to create a 50/200 de-interleaver 10. In FIG. 2, the 50/100 GHz de-interleaver 11 de-interleaves input signals 1 ($\lambda_1$, $\lambda_2$, $\lambda_3$ ... ) with channel spacing 50 GHz into signals 2 ($\lambda_1$, $\lambda_3$, $\lambda_5$ ... ) with channel spacing 100 GHz and signals 3 ($\lambda_2$, $\lambda_4$, $\lambda_6$ ... ) with channel spacing 100 GHz. The first 100/200 GHz de-interleaver 12 de-interleaves signals 2 ($\lambda_1$, $\lambda_3$, $\lambda_7$ ... ) with channel spacing 100 GHz into output signals 4 ($\lambda_1$, $\lambda_5$, $\lambda_9$ ... ) with channel spacing 200 GHz and output signals 5 ($\lambda_3$, $\lambda_7$, $\lambda_{11}$ ... ) with channel spacing 200 GHz. The second 100/200 GHz de-interleaver 13 de-interleaves signals 3 ($\lambda_2$, $\lambda_4$, $\lambda_6$ ... ) with channel spacing 100 GHz into output signals 6 ($\lambda_2$, $\lambda_6$, $\lambda_{10}$ ... ) with channel spacing 200 GHz and output signals 7 ($\lambda_4$, $\lambda_8$, $\lambda_{12}$ ... ) with channel spacing 200 GHz.

However, simply cascading several de-interleavers together leads to substantially larger system size, high insertion loss and more optical components. Therefore there is a need to create an integral device with simplified structure and low insertion loss as an optical de-interleaver having output channel spacings that are 4 times, even 8 times of the input channel spacing.

In the present application, if input signals ($\lambda_1$, $\lambda_2$, $\lambda_3$ ... ) has a channel spacing S, signals ($\lambda_1$, $\lambda_3$, $\lambda_5$ ... ) with channel spacing 2S and signals ($\lambda_2$, $\lambda_4$, $\lambda_6$ ... ) with channel spacing 2S are defined as odd channel signals and even channel signals respectively. Signals ($\lambda_1$, $\lambda_5$, $\lambda_9$ ... ) with channel spacing 4S, signals ($\lambda_3$, $\lambda_7$, $\lambda_{11}$ ... ) with channel spacing 4S, signals ($\lambda_2$, $\lambda_6$, $\lambda_{10}$ ... ) with channel spacing 4S and signals ($\lambda_4$, $\lambda_8$, $\lambda_{12}$ ... ) with channel spacing 4S are defined as odd-odd, odd-even, even-odd and even-even channel signals respectively.

The principle of a polarization interferometer based interleaver/de-interleaver has been discussed by the inventor of the present application in a co-pending U.S. patent application Ser. No. 09/929,875 filed on Aug. 13, 2001 and entitled "Gires-Tournois Interferometer with Faraday Rotator and Optical Signal Interleaver".

Figure 3A:
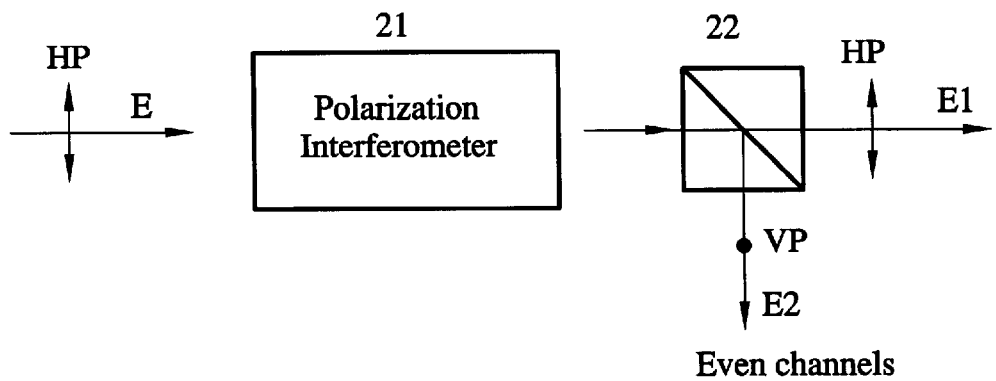
FIG. 3a shows the working principle of a polarization interferometer based deinterleaver.

FIG. 3a shows the working principle of a polarization interferometer based de-interleaver 20. The incident light beam E includes the signals of all channels and is horizontally polarized HP. Suppose the incident beam E has zero phase delay and unit amplitude, i.e. E=1. When the beam passes through or is reflected from the polarization interferometer 21, the polarization interferometer 21 changes the polarization status of the beam E from linear polarizations to elliptical polarizations which are dependent on the wavelength λ. When the light beam E travels to a polarization beam splitter 22, one portion of the beam E1 passes through the polarization beam splitter 22. This portion of the beam includes the signals of odd channels and has horizontal polarization HP that is parallel to the polarization of the incident beam E. The expression for the amplitude and phase for the beam containing odd channels is $$\cos\frac{\Delta\phi(\lambda)}{2}e^{i\psi_l(\lambda)} \quad (1)$$

(See equations (4) and (5) for $\Delta\phi(\lambda)$ and $\psi_1(\lambda)$).

Another portion of the beam E2 is reflected by the polarization beam splitter 22. This portion of the beam E2 includes signals of even channels and has vertical polarization VP that is perpendicular to the polarization of the incident beam. The expression for the amplitude and phase for the beam containing even channels is $$\sin\frac{\Delta\phi(\lambda)}{2}e^{i\psi_l(\lambda)}. \quad (2)$$

Figure 3B:
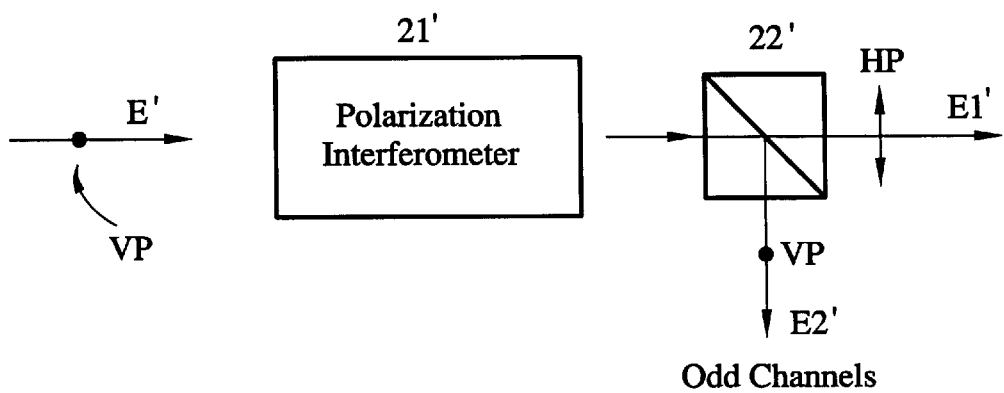
FIG. 3b shows the working principle of a polarization interferometer based deinterleaver.

FIG. 3b shows the working principle of a polarization interferometer based de-interleaver 20'. Suppose the incident beam E has zero phase delay and unit amplitude, i.e. E'=1. When the beam passes through or is reflected from the polarization interferometer 21', the polarization interferometer 21' changes the polarization status of the beam E' from linear polarizations to elliptical polarizations which are dependent on the wavelength λ. In FIG. 3b the incident beam E' has vertical polarization VP. In this case, the portion of the beam E1' passing through the polarization beam splitter 22' has horizontal polarization HP that is perpendicular to the polarization of the incident beam. The expression for its amplitude and phase is the equation (2). This means that this portion of the beam E1' includes the signals of even channels. The portion of the beam E2' that is reflected by the polarization beam splitter 22' has vertical polarization VP that is parallel to the direction of polarization of the incident beam E'. The expression for its amplitude and phase is equation (1). This portion of the beam E2' includes the signals of odd channels.

Therefore, the light beam emerged the polarization beam splitter 22 or 22' includes the signals of odd channels (equation (1)) if its polarization is parallel with the polarization of the incident beam. The light beams emerged from the polarization beam splitter 22 or 22' includes the signals of even channels (equation (2)) if its polarization is perpendicular to the polarization of the incident beam.

Figure 4:
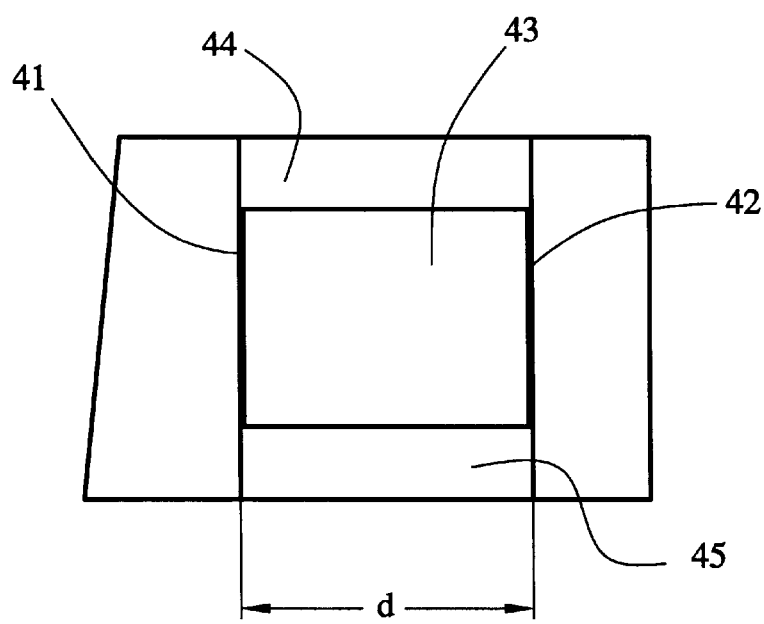
FIG. 4 illustrates a Gires-Tournois interferometer which has a first partially reflective mirror and a second substantially 100% reflective mirror.

FIG. 4 illustrates a Gires-Tournois interferometer (GTI) 40 which has a first partially reflective mirror 41 spaced apart and parallel with a second substantially 100% reflective mirror 42. The first partially reflective mirror 41 provides a single input/output port to allow light to be launched into and out of the cavity 43. The spacers 44, 45 are made of ultra-low expansion material. The length of the cavity between the first partially reflective mirror 41 and the second substantially 100% reflective mirror 42 is indicated by d.

Figure 5:
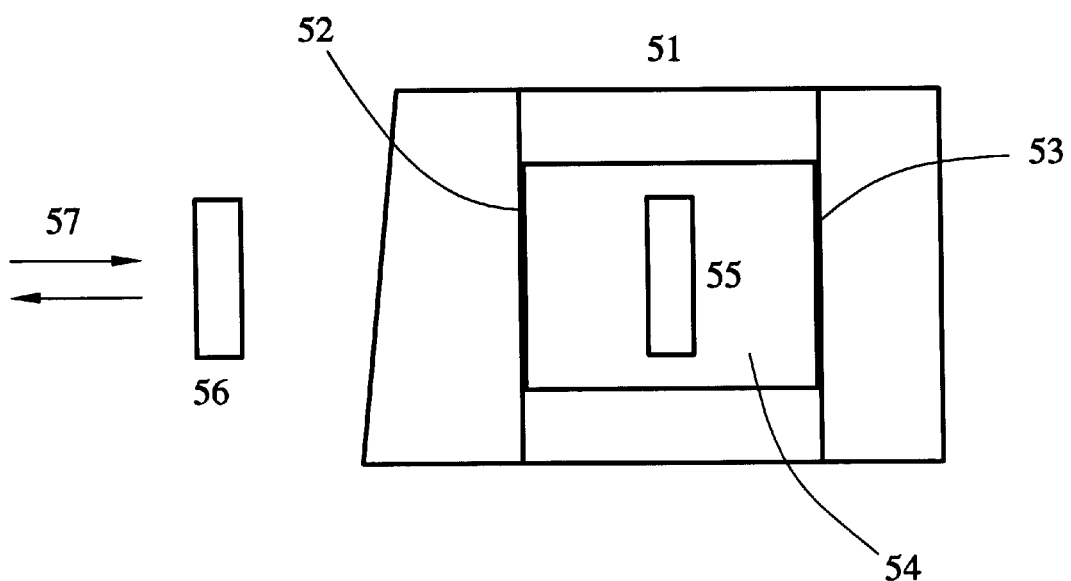
FIG. 5 shows the cross-section view of a polarization interferometer consisting of a Gires-Tournois interferometer and two Faraday rotators (garnets) or two wave-plates.

FIG. 5 shows the cross-section (top) view of the polarization interferometer 50 consisting of a Gires-Tournois interferometer (GTI) 51 and two Faraday rotators (garnets) or two wave-plates. The Gires-Tournois interferometer (GTI) 51 includes a partially reflective mirror 52 that is spaced apart from and parallel to a substantially 100% reflective mirror 53. A 45 degree garnet 55 (or quarter-wave plate) is disposed inside of the Gires-Tournois interferometer 51 and a 22.5 degree garnet 56 (or 1/8-wave plate) is disposed in front of the Gires-Tournois interferometer 51. The first mirror 52 provides a single input/output port to allow light beams 57 to be launched into and out of the cavity 54.

The amplitude response of the Gires-Tournois interferometer (GTI) is flat (independent of wavelength) and the phase response is $$\psi(\lambda) = -2\tan^{-1}\left[\frac{1+\sqrt{R_1}}{1-\sqrt{R_1}}\tan\left(\frac{2\pi d}{\lambda}\right)\right] \quad (3)$$

where λ is wavelength; $R_1$ is power reflectivity of the partially reflective mirror; d is the cavity length and $2\pi d/\lambda$ is the single pass phase delay in the cavity of the Gires-Tournois interferometer.

The co-pending U.S. patent application Ser. No. 09/929,875 entitled "Gires-Tournois Interferometer with Faraday Rotator and Optical Signal Interleaver" uses the above-mentioned polarization interferometer and gives the phase difference $\Delta\phi(\lambda)$:

$$\Delta\phi(\lambda) = -2\tan^{-1}\left[\frac{1+\sqrt{R_1}}{1-\sqrt{R_1}}\tan\left(\frac{2\pi L}{\lambda}-\frac{\pi}{4}\right)\right] + \quad (4)$$
$$2\tan^{-1}\left[\frac{1+\sqrt{R_1}}{1-\sqrt{R_1}}\tan\left(\frac{2\pi L}{\lambda}+\frac{\pi}{4}\right)\right]-\frac{\pi}{2}$$

and phase delay $\psi_1(\lambda)$:

$$\psi_1(\lambda) = -\tan^{-1}\left[\frac{1+\sqrt{R_1}}{1-\sqrt{R_1}}\tan\left(\frac{2\pi L}{\lambda}-\frac{\pi}{4}\right)\right] - \quad (5)$$
$$\tan^{-1}\left[\frac{1+\sqrt{R_1}}{1-\sqrt{R_1}}\tan\left(\frac{2\pi L}{\lambda}+\frac{\pi}{4}\right)\right]$$

where L is the effective optical length of the cavity. For a 50/100 GHz interleaver or de-interleaver, L=1.499 mm and $R_1$=18.5%±0.5%.

Figure 6:
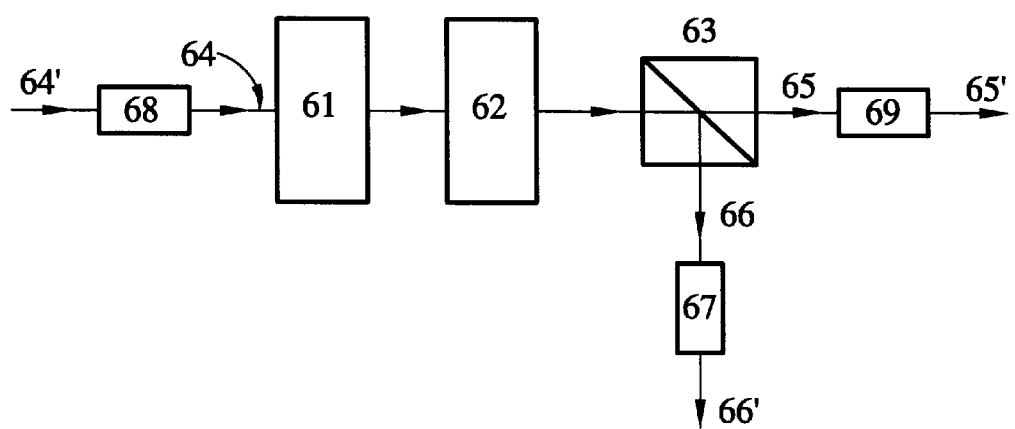
FIG. 6 is a schematic view of a S/2S de-interleaver with dispersion compensation.

FIG. 6 is a schematic view of a de-interleaver 60 with dispersion compensation disclosed in the the co-pending U.S. patent application Ser. No. 09/929,875 entitled "Gires-Tournois Interferometer with Faraday Rotator and Optical Signal Interleaver". In FIG. 6, an input beam 64' carrying a set of optical signals with even and odd channels having channel spacing S is introduced by a first port 68 to provide two lineraly polarized beams 64. The two lineraly polarized beams 64 go through a optical dispersion compensator 61, a polarization interferometer 62 and then are split by a polarization beam splitter 63 into two lineraly polarized beams 65 of odd channels and two lineraly polarized beams 66 of even channels. A second port 69 recieves the two lineraly polarized beams 65 to provide a first output beam 65' of odd channels having channel spacing 2S. A third port 67 recieves the two lineraly polarized beams 66 to provide a second output beam 66' of even channels having channel spacing 2S.

Figure 7:
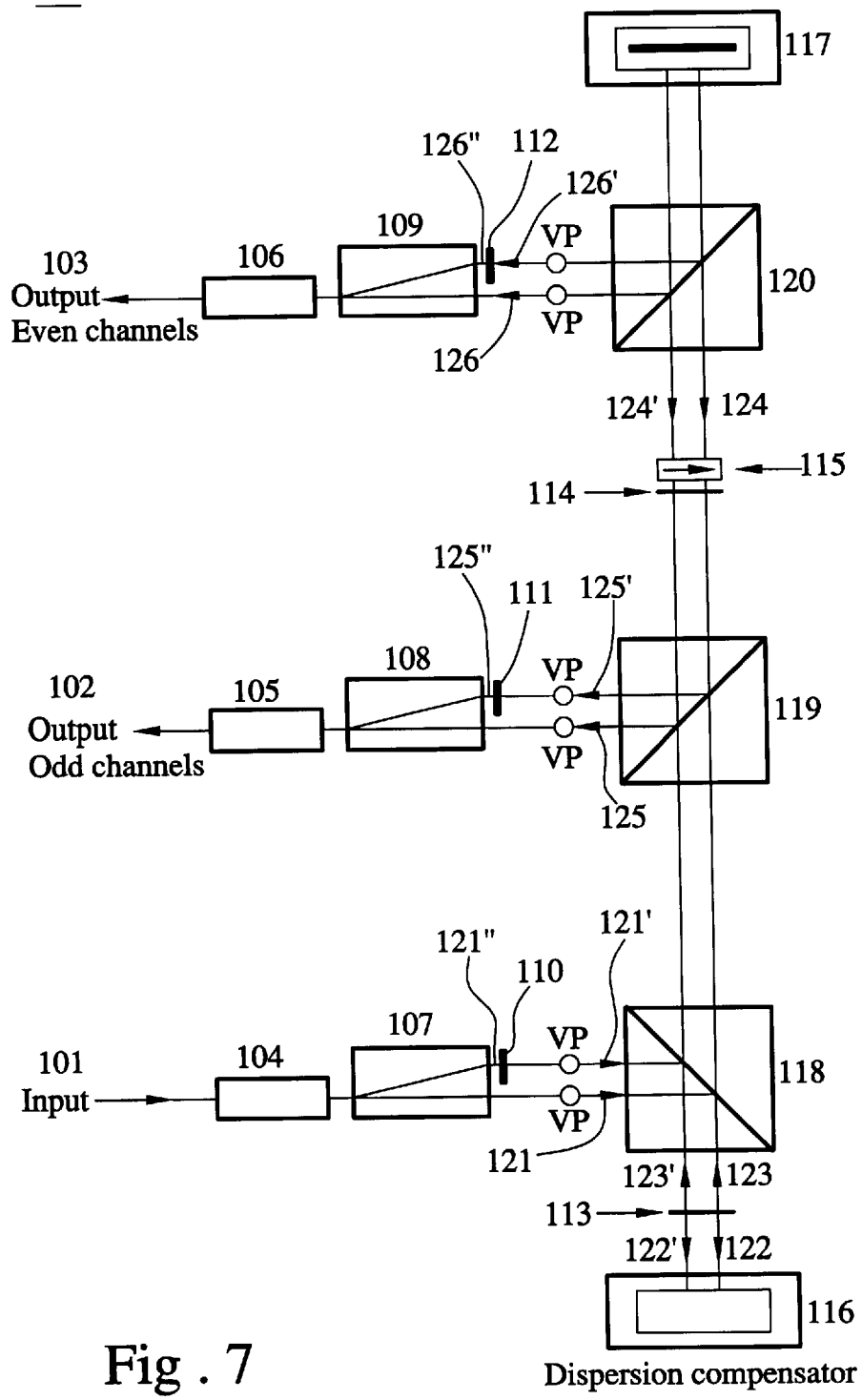
FIG. 7 illustrates an embodiment of an optical de-interleaver with dispersion compensation of FIG. 6.

FIG. 7 illustrates an embodiment of the optical de-interleaver 100 with dispersion compensation as shown in FIG. 6. The input beam 101 carries a set of optical signals having even and odd channels with channel spacing S and a first collimator 104 collimates the input beam 101. A first Walk-off crystal 107 separates the beam from the first collimator 104 into vertically polarized (VP) beam 121 and horizontally polarized beam 121". A first half-wave plate 110 rotates the horizontally polarized beam 121" to vertically polarized (VP) beam 121'. A first polarization beam splitter 118 reflects both vertically polarized (VP) beams 121, 121' to a quarter-wave plate 113 which transforms the plane-polarized beams 121, 121' to circularly polarized beams 122, 122'. The circularly polarized beams 122, 122' travel to the dispersion compensator 116 which changes phase of signals by $\psi_c(\lambda)$ (see equation (6)).

The beams reflected from the dispersion compensator 116 pass through the quarter wave plate 113 again which transforms the circularly polarized signals to two horizontally polarized beams 123, 123'. Both horizontally polarized beams 123, 123' pass through the first polarization beam splitter 118, a second polarization beam splitter 119, a second half-wave plate 114 (which rotates the polarization of the beams a positive 45 degree), garnet 115 (which rotates the polarization the beams a negative 45 degree), a third polarization beam splitter 120 and then get into a polarization interferometer 117.

The beams 124, 124' of odd channel signals reflected from the polarization interferometer 117 pass through third polarization beam splitter 120 to the garnet 115. The garnet 115 rotates the horizontally polarized beams 124, 124' a 45 degree and the second halfwave plate 114 rotates them another 45 degree, finally, the horizontally polarized beams 124, 124' becomes the vertically polarized beams 125 and 125' which are reflected by the second polarization beam splitter 119 to second walk-off crystal 108. The third half-wave plate 111 rotate vertically polarized beam 125' to horizontally polarized beam 125". The second walk-off crystal 108 combines the vertically polarized beam 125 and the horizontally polarized beam 125" of the odd channel signals to a second collimator 105 to provide an first output beam 102 of odd channel signals having channel spacing 2S.

The beams 126, 126' of even channels reflected from the polarization interferometer 117 are reflected by the third polarization beam splitter 120 to a third walk-off crystal 109. A fourth half-wave plate 112 rotates the vertically polarized beam 126' to the horizontally polarized beam 126". The thirt walk-off crystal 109 combines the vertically polarized beams 126 and the horizontally polarized beam 126" of even channels to a third collimator 106 to provide a second output beam 103 of even channel signals having channel spacing 2S.

The aforementioned dispersion compensator 116 is also a Gires-Tournois interferometer, its phase response is $$\psi_C(\lambda) = -2\tan^{-1}\left[\frac{1+\sqrt{R_2}}{1-\sqrt{R_2}}\tan\left(\frac{2\pi d}{\lambda}\right)\right] \quad (6)$$

The group delay $\tau(\lambda)$ (ps) and dispersion $D(\lambda)$ (ps/nm) are respectively, $$\tau(\lambda) = \frac{0.01\lambda^2}{6\pi}\frac{d\psi_c(\lambda)}{d\lambda} \quad (7)$$

$$D(\lambda) = 10^{-3}\frac{d\tau(\lambda)}{d\lambda} \quad (8)$$

The total phase shift of the deinterleaver with dispersion compensation is $$\psi_T(\lambda)=\psi_1(\lambda)+\psi_c(\lambda) \quad (9)$$

For a 50/100 GHz deinterleaver without dispersion compensation the dispersion value is ±50 ps/nm. This value is reduced to ±6 ps/nm for a 50/100 GHz deinterleaver (S=50 GHz) with dispersion compensation as shown in FIG. 7.

Figure 8:
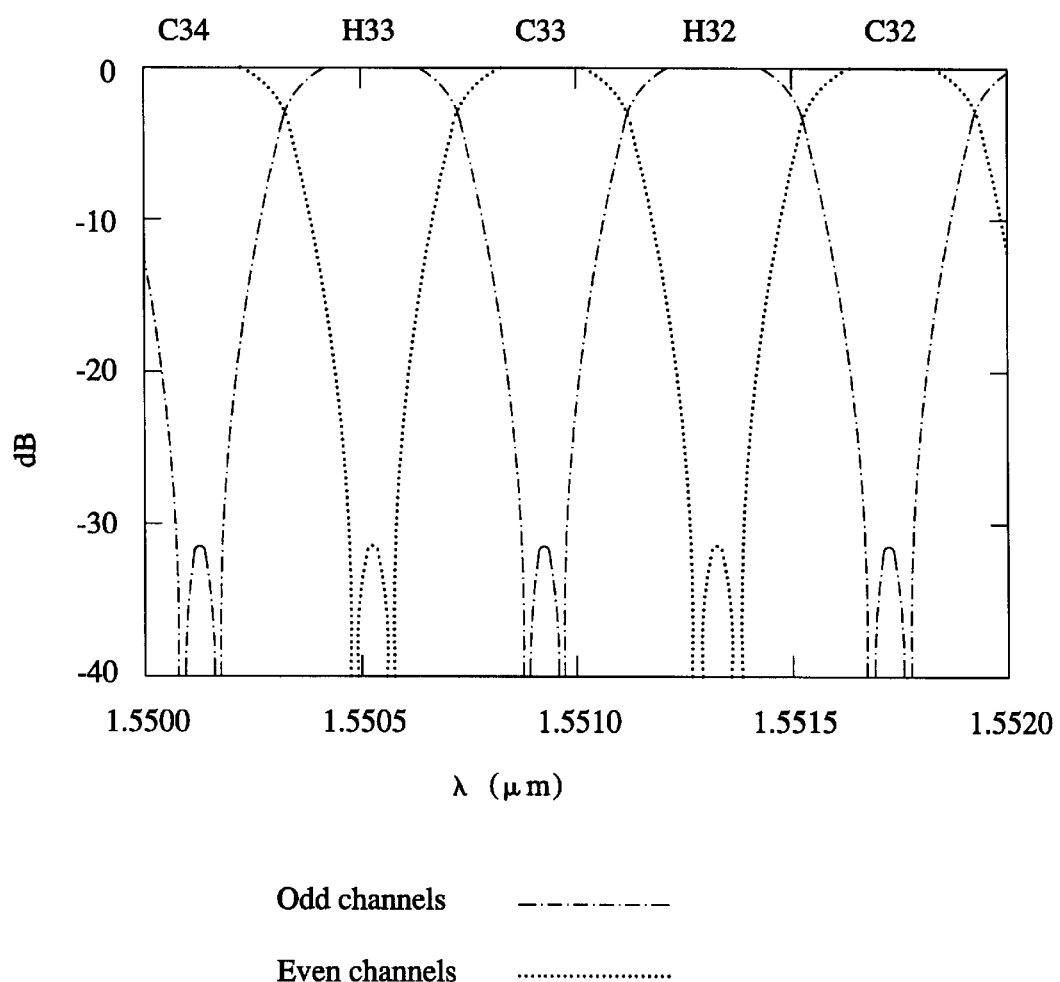
FIG. 8 illustrates the output spectrum of odd and even channels of the 50/100 GHz de-interleaver shown in FIG. 7.

FIG. 8 illustrates the output spectrum of odd and even channels of the 50/100 GHz (S=50 GHz) de-interleaver shown in FIG. 7. The 0.5 dB passband width and −25 dB isolation stopband width given by FIG. 8 are 35 GHz and 18.8 GHz respectively. However, some applications in DWDM require that the −25 dB isolation stopband width of deinterleaver be not less than 20 GHz.

According to International Telecommunication Union (ITU) 100 GHz and 50 GHz Wavelength Standard, the channel "C" is on ITU Grid and represents "even channel" for 50 GHz channel spacing, and the channel "H" is 50 GHz offset from ITU Grid and represents "odd channel" for 50GHz channel spacing. In FIG. 8 and in following FIGS. 11, 14a, 14b, 21a and 21b, C34, H33, C33, H32, C32, H31 and C31 represent ITU channels.

Figure 9:
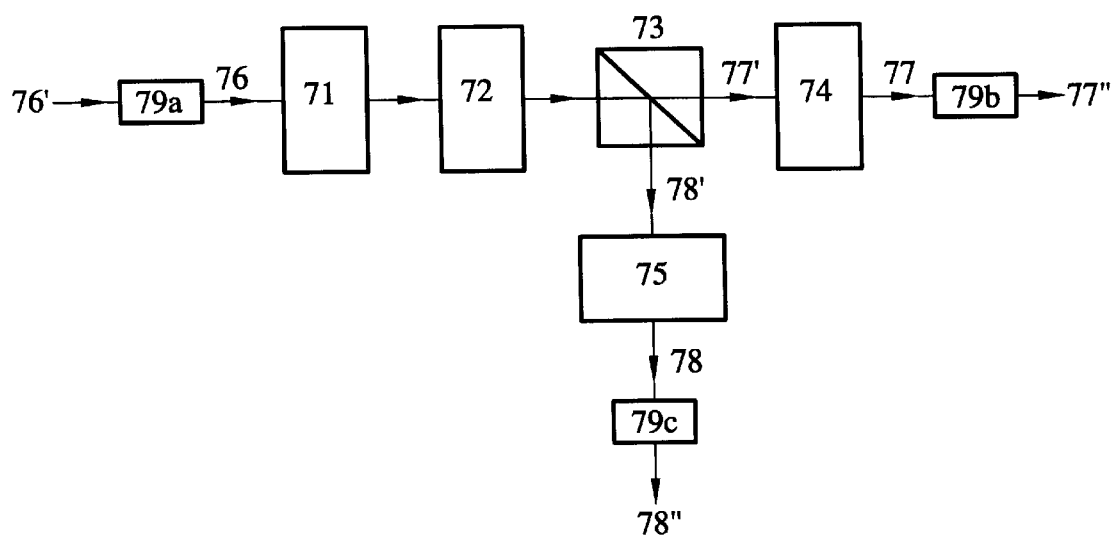
FIG. 9 is a schematic illustration of a S/2S GHz de-interleaver with high isolation and dispersion compensation.

FIG. 9 is a schematic illustration of a S/2S GHz de-interleaver 70 with high isolation and dispersion compensation disclosed in co-pending U.S. Patent Application entitled "De-Interleaver with High Isolation and Dispersion Compensation, and 50/200 GHz Interleaver and De-Interleaver". In FIG. 9, an input beams 76' carrying a set of optical signals with even and odd channels having channel spacing S is introduced by a first port 79a to provide two linearly polarized beams 76 with even and odd channel signals.

The two linearly polarized beams 76 go through a optical dispersion compensator 71, a first polarization interferometer 72 and then are split by a polarization beam splitter 73 into two linearly polarized beams 77' of odd channels and two linearly polarized beams 78' of even channels. The two linearly polarized beams 77' goes through a second polarization interferometer 74 and become two linearly polarized beams 77 which are received by a second port 79b to provide a first output beam 77" of odd channel signals having channel spacing 2S. The two linearly polarized beams 78' go through a third polarization interferometer 75 and are received by a third port 79c to provide a second output beam 78" of even channel signals having channel spacing 2S. The extra polarization interferometers 74 and 75 in FIG. 9 filter the signals of the even and odd channels one more time, respectively, to obtain high isolation.

Figure 10:
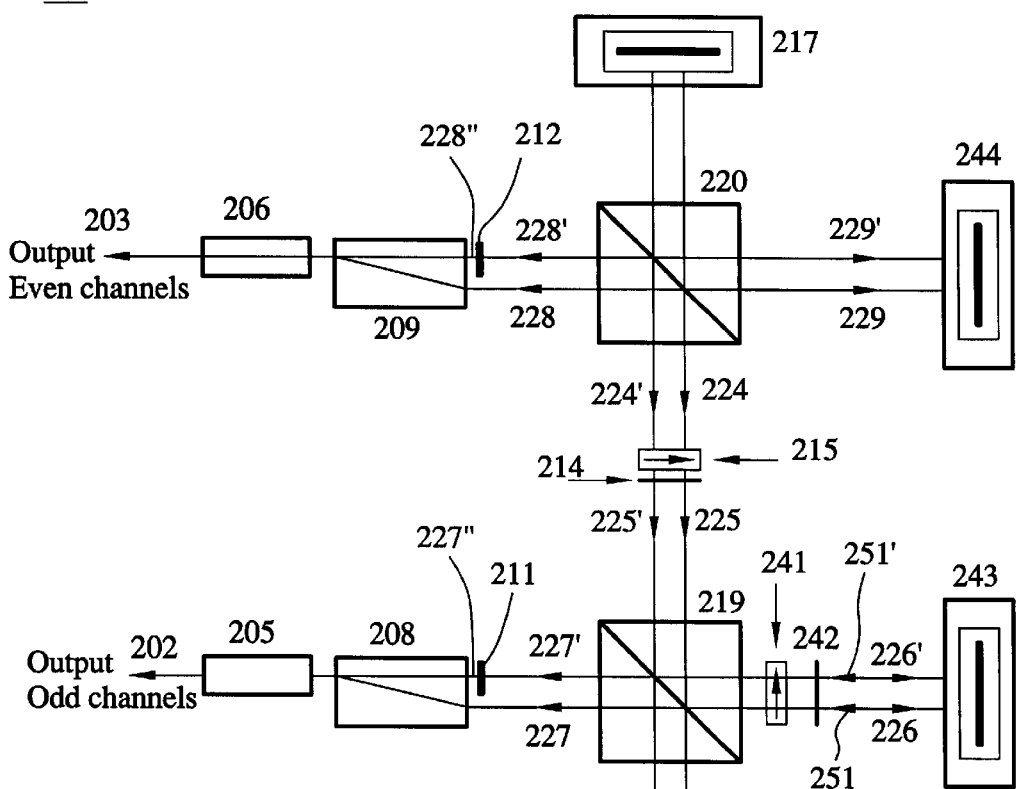
FIG. 10 illustrates an embodiment of a 50/100 GHz optical de-interleaver with dispersion compensation of FIG. 9.

FIG. 10 illustrates an embodiment of a 50/100 GHz optical de-interleaver 200 with dispersion compensation as shown in FIG. 9. The input beam 201 carries a set of optical signals having even and odd channels with channel spacing 50 GHz and a first collimator 204 collimates the input beam 201. A first Walk-off crystal 207 separates the beam from the first collimator 204 into vertically polarized (VP) beam 221 and horizontally polarized beam 221". A first half-wave plate 210 rotates the horizontally polarized beam 221" to vertically polarized (VP) beam 221'. A first polarization beam splitter 218 reflects both vertically polarized (VP) beams 221, 221' to a quarter-wave plate 213 which transforms the linearly polarized beams 221, 221' to circularly polarized beams 222, 222'. The circularly polarized beams 222, 222' travel to a dispersion compensator 216 which changes phase of signals by $\psi_c(\lambda)$ (see equation (6)).

The beams reflected from the dispersion compensator 216 pass through the quarter wave plate 213 again which transforms the circularly polarized beams to two horizontally polarized beams 223, 223'. Both horizontally polarized beams 223, 223' pass through the first polarization beam splitter 218, a second polarization beam splitter 219, a second half-wave plate 214 (which rotates the polarization of the beams a positive 45 degree), a first garnet 215 (which rotates the polarization of the beams a negative 45 degree), a third polarization beam splitter 220 and then get into a first polarization interferometer 217.

The beams 224, 224' of odd channels reflected by the first polarization interferometer 217 pass through the third polarization beam splitter 220 and travel to the garnet 215. The first garnet 215 rotates the horizontally polarized beams 224, 224' a 45 degree and the second half-wave plate 214 rotates them another 45 degree, finally, the horizontally polarized beams become the vertically polarized beams 225, 225' which are reflected by the second polarization beam splitter 219 to a second garnet 241. The second garnet 241 rotates the vertically polarized beams 225, 225' a 45 degree and a third half-wave plate 242 rotates them another 45 degree, finally, the vertically polarized beams 225, 225' become the horizontally polarized beams 226, 226' which travel to a second polarization interferometer 243. The horizontally polarized beams 251, 251' of odd channels reflected back from the second polarization interferometer 243 pass through the third half-wave plate 242 and the second garnet 241 again. The third half-wave plate 242 rotates the polarization of the beams 251, 251' a positive 45 degree, the second garnet 241 rotates them a negative 45 degree, the polarization of beams 251, 251' of odd channels retain horizontal. The horizontally polarized signals 227, 227' of odd channels after passing through the second polarization beam splitter 219 travel to a second walk-off crystal 208. A fourth half-wave plate 211 rotates the horizontally polarized beam 227' to the vertically polarized beam 227". The second walk-off crystal 208 combines the horizontally polarized signals 227 and the vertically polarized signals 227" to a second collimator 205 to provide a first output beam 202 of odd channel signals having channel spacing 100 GHz. The expression of the amplitude and phase of the output light beams 202 is:

$$\cos^2 \frac{\Delta\phi(\lambda)}{2} e^{i2\psi_l(\lambda)} \quad (10)$$

The vertically polarized beams 229, 229' of even channels reflected by the third polarization beam splitter 220 travel to a third polarization interferometer 244. The signals 228, 228' of even channels reflected by the third polarization interferometer 244 pass through the third polarization beam splitter 220 to a third walk-off crystal 209. A fifth half-wave plate 212 rotates the horizontally polarized beam 228' to the vertically polarized beam 228". The third walk-off crystal 209 combines the horizontally polarized beam 228 and the vertically polarized beam 228" to a third collimator 206 to provide a second output beam 203 of even channel signals having channel spacing 100 GHz. The expression of the amplitude and phase of the second output light beams 203 is:

$$\sin^2 \frac{\Delta\phi(\lambda)}{2} e^{i2\psi_l(\lambda)} \quad (11)$$

Figure 11:
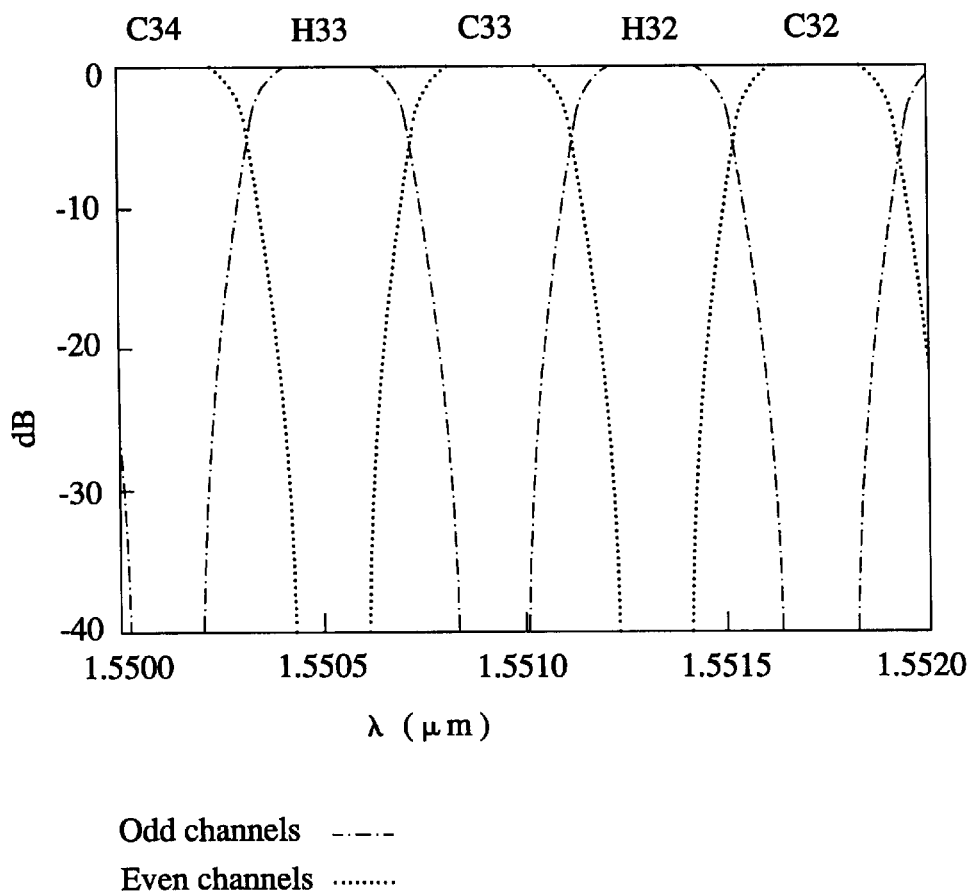
FIG. 11 illustrates the output spectrum of odd and even channels of the 50/100 GHz deinterleaver with high isolation and dispersion compensation shown in FIG. 10.

FIG. 11 illustrates the output spectrum of odd and even channels of the 50/100 GHz de-interleaver with high isolation and dispersion compensation as shown in FIG. 10. FIG. 11 shows that the 0.5 dB passband width and −25 dB isolation stopband width are 30 GHz. The −40 dB isolation stopband width of this de-interleaver is 21.5 GHz. The de-interleaver with high isolation can meet the requirements for most of applications in DWDM. Without dispersion compensation the absolute value of dispersion for the 50/100 GHz deinterleaver with high isolation is larger than 100 ps/nm, but this value is now less than 24 ps/nm after dispersion compensation. In the calculation of the dispersion compensation, following parameters of a GTI of the dispersion compensator are used: the cavity length of GTI d=2.998 mm and the reflectivity of the partially reflected surface of the GTI $R_2$=1.44 % (See also equation (6)).

In this embodiment (FIG. 10), there are three polarization interferometers which are the most expensive components of a Polarization Interferometer based Interleaver/de-interleaver. On the other hand, it is relatively hard to adjust three polarization interferometers such that those three polarization interferometers possess almost the same performances including the same shapes of spectrum, the same center frequencies of channels and the same temperature stability of the center frequency. In order to reduce the cost and to simplify the process of manufacture, and to improve the performances of the device, there is a desired demand to reduce the number of polarization interferometers, e.g. from three to one, without lowering the performance of the device.

Figure 12:
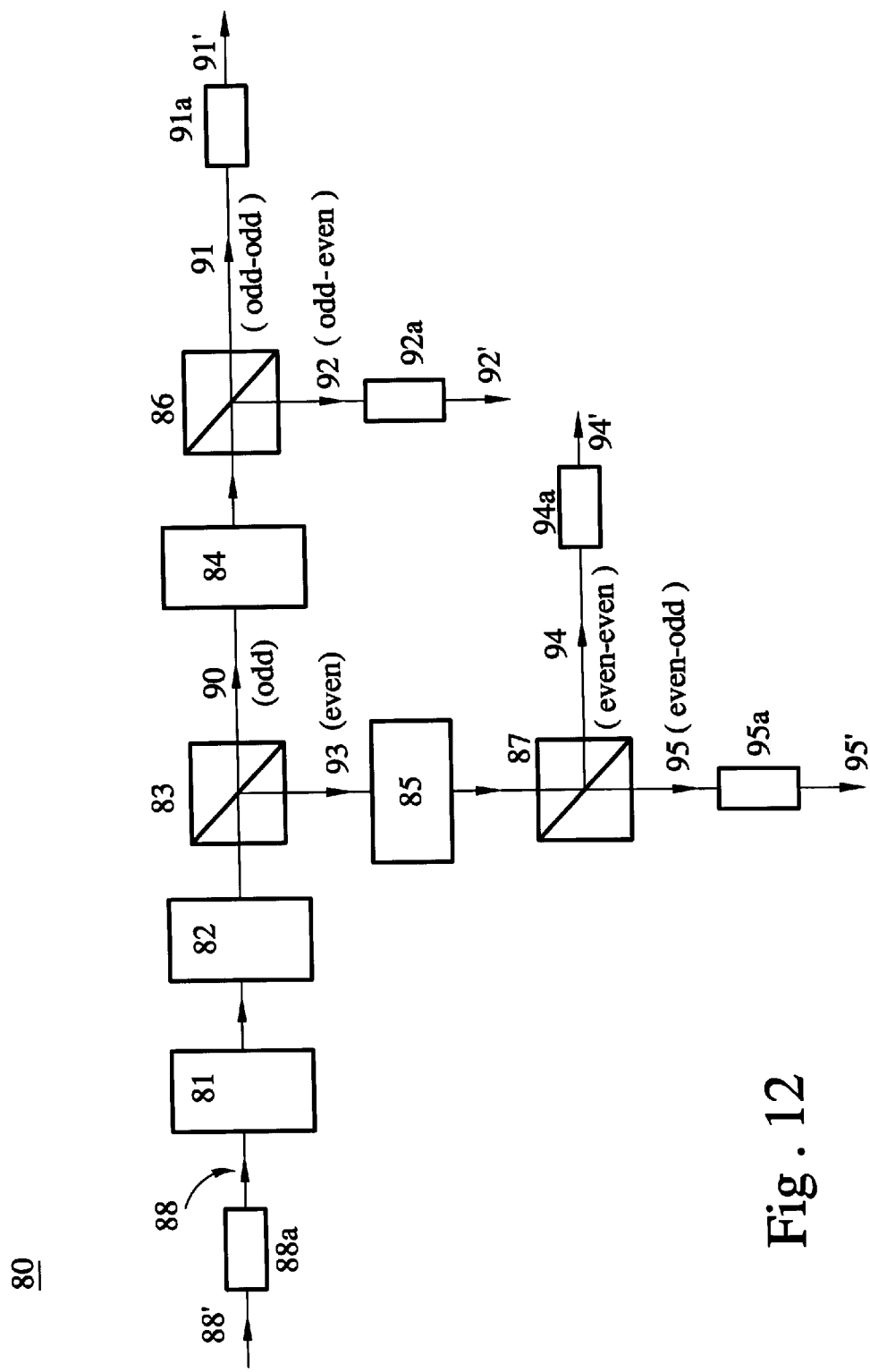
FIG. 12 is a schematic view of a S/4S GHz de-interleaver with dispersion compensation.

FIG. 12 is a schematic view of a S/4S de-interleaver 80 with dispersion compensation disclosed in co-pending U.S. Patent Application entitled "De-Interleaver with High Isolation and Dispersion Compensation, and 50/200 GHz Interleaver and De-Interleaver". In FIG. 12, an input beam 88' carrying a set of optical signals with channel spacing S is introduced by a first port 88a to provide two linearly polarized beams 88 with all channels having channel spacing S. The two linearly polarized beams 88 go through a optical dispersion compensator 81, a first polarization interferometer 82 and then are split by a first polarization beam splitter 83 into first two linearly polarized beams 90 of odd channels having channels spacing 2S and second two linearly polarized beams 93 of even channels having channels spacing 2S.

The first two linearly polarized beams 90 go through a second polarization interferometer 84 and are split by a second polarization beam splitter 86 into two linearly polarized beams 91 of odd-odd channels having channel spacing 4S and two linearly polarized beams 92 of odd-even channels having channel spacing 4S. The two linearly polarized beams 91 of odd-odd channels are received by a second port 91a to provide a first output beam 91' of odd-odd channel signals having channel spacing 4S. The two linearly polarized beams 92 of odd-even channels are received by a third port 92a to provide a second output beam 92' of odd-even channel signals having channel spacing 4S.

The second two linearly polarized beams 93 go through a third polarization interferometer 85 and are split by a third polarization beam splitter 87 into two linearly polarized beams 95 of even-odd channels having channel spacing 4S and two linearly polarized beams 94 of even-even channels having channel spacing 4S. The two linearly polarized beams 95 of even-odd channels are received by a fourth port 95a to provide a third output beam 95' of even-odd channel signals having channel spacing 4S. The two linearly polarized beams 94 of even-even channels are received by a fifth port 94a to provide a fourth output beam 94' of even-even channel signals having channel spacing 4S.

Figure 13:
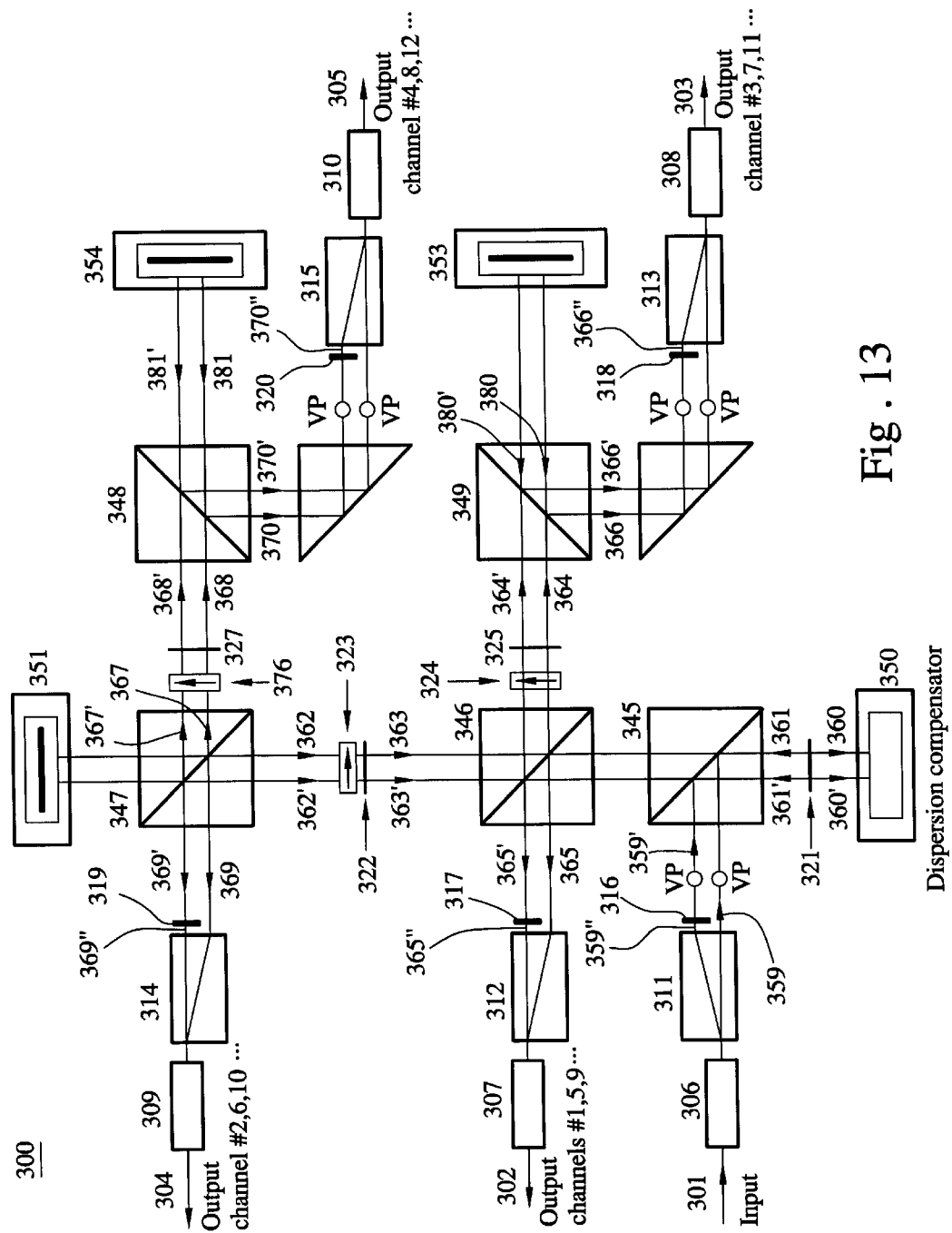
FIG. 13 illustrates an embodiment of a 50/200 GHz de-interleaver with dispersion compensation of FIG. 12.

FIG. 13 illustrates an embodiment of a 50/200 GHz de-interleaver 300 with dispersion compensation as shown in FIG. 12. The difference between FIG. 13 and FIG. 10 is that the Free Spectrum Ranges (FSR) of the second and third polarization interferometers 353, 354 in FIG. 13 are 200 GHz and the Free Spectrum Ranges (FSR) of the second and third polarization interferometers 243, 244 in FIG. 10 are 100 GHz.

An input beam 301 carries a set of optical signals with channel spacing 50 GHz and a first collimator 306 collimates the input signals 301. A first Walk-off crystal 311 separates the beam from the first collimator 306 into vertically polarized (VP) beam 359 and horizontally polarized beam 359". A first half-wave plate 316 rotates the horizontally polarized beam 359" to vertically polarized (VP) beam 359'. A first polarization beam splitter 345 reflects both vertically polarized (VP) beams 359, 359' to a quarter-wave plate 321 which transforms the linearly polarized signals 359, 359' to circularly polarized beams 360, 360'. The circularly polarized beams 360, 360' travel to a dispersion compensator 350 which changes phase of signals by $\psi_c(\lambda)$ (see equation (6)).

The beams reflected from the dispersion compensator 350 pass through the quarter wave plate 321 again which transforms the reflected circularly polarized beams to two horizontally polarized beams 361, 361'. Both horizontally polarized beams 361, 361' pass through the first polarization beam splitter 345, a second polarization beam splitter 346, a second half-wave plate 322 (which rotates the polarization of the beams a positive 45 degree), a first garnet 323 (which rotates the polarization of the beams a negative 45 degree), a third polarization beam splitter 347 and then get into a first polarization interferometer (50/100 GHz) 351.

The beams 362, 362' of odd channels having channel spacing 100 GHz reflected back from the first polarization interferometer 351 pass through the third polarization beam splitter 347 and travel to the first garnet 323. The first garnet 323 rotates the horizontally polarized beams 362, 362' a 45 degree and the second half-wave plate 322 rotates them another 45 degree, finally, the horizontally polarized beams 362, 362' become the vertically polarized beams 363, 363' which are reflected by the second polarization beam splitter 346 to a second garnet 324. The second garnet 324 rotates the vertically polarized beams 363, 363' a 45 degree and a third half-wave plate 325 rotates them another 45 degree, finally, the vertically polarized beams 363, 363' become the horizontally polarized beams 364, 364' which travel to a second polarization interferometer (100/200 GHz) 353.

The horizontally polarized beams 380, 380' of odd-odd channels having channel spacing 200 GHz reflected back from the second polarization interferometer 353 pass through a fourth polarization beam splitter 349, the third half-wave plate 325 and the second garnet 324 again. The third half-wave plate 324 rotates the polarization of the beams 380, 380' a positive 45 degree, the second garnet 324 rotates the polarization of the beams a negative 45 degree, the polarization of the beams 365, 365' of odd-odd channels after passing through the second polarization beam splitter 346 retain horizontal. The horizontally polarized beams 365, 365' of odd-odd channels passing through the second polarization beam splitter 346 travel to a second walk-off crystal 312. A fourth half-wave plate 317 rotates the horizontally polarized beam 365' to the vertically polarized beam 365". The second walk-off crystal 312 combines the horizontally polarized beam 365 and the vertically polarized beam 365" to a second collimator 307 to provide a first output beam 302 of odd-odd channel signals having channel spacing 200 GHz.

The vertically polarized beam 366, 366' of odd-even channels having channel spacing 200 GHz reflected back from the second polarization interferometer 353 are reflected by the fourth polarization beam splitter 349 to a third walk-off crystal 313. A fifth half-wave plate 318 rotates the vertically polarized beam 366 to the horizontally polarized beam 366". The third walk-off crystal 313 combines the vertically polarized signals 366' and the horizontally polarized signals 366" to a fourth collimator 308 to provide a second output beam 303 of odd-even channel signals having channel spacing 200 GHz.

The vertically polarized beams 367, 367' of even channels having channel spacing 100 GHz are reflected by the third polarization beam splitter 347 to a third garnet 326. The third garnet 326 rotates the vertically polarized beams 367, 367' a 45 degree and a sixth half-wave plate 327 rotates them another 45 degree, finally, the vertically polarized beams 367, 367' become the horizontally polarized beams 368, 368' which travel to a third polarization interferometer (100/200 GHz) 354.

The horizontally polarized beams 381, 381' of even-odd channels having channel spacing 200 GHz reflected back from the third polarization interferometer 354 pass through a fifth polarization beam splitter 348, the sixth half-wave plate 327 and the third garnet 326 again. The sixth half-wave plate 327 rotates the polarization of the beams 381, 381' a positive 45 degree, the second garnet 326 rotates the polarization of the beams 381, 381' a negative 45 degree, the polarization of signals of even-odd channels retain horizontal. The horizontally polarized signals 369, 369' of even-odd channels after passing through the third polarization beam splitter 347 travel to a fourth walk-off crystal 314. A seventh half-wave plate 319 rotates the horizontally polarized beam 369' to the vertically polarized beam 369". The fourth walk-off crystal 314 combines the vertically polarized beam 369" and the horizontally polarized beam 369 to a fourth collimator 309 to provide a third output beam 304 of even-odd channel signals having channel spacing 200 GHz.

The vertically polarized beams 370, 370' of even-even channels having channel spacing 200 GHz reflected back from the third polarization interferometer 354 are reflected the fifth polarization beam splitter 348 to a fifth walk-off crystal 315. A eighth half-wave plate 320 rotates the vertically polarized beam 370 to the horizontally polarized beam 370". The fifth walk-off crystal 315 combines the vertically polarized signals 370' and the horizontally polarized signals 370" to a fifth collimator 310 to provide a fourth output beam 305 of even-even channel signals having channel spacing 200 GHz. Finally, the input beam 301 of all channels with channel spacing 50 GHz are split to four output beams 302, 303, 304 and 305 with channel spacing 200 GHz.

Figure 14A:
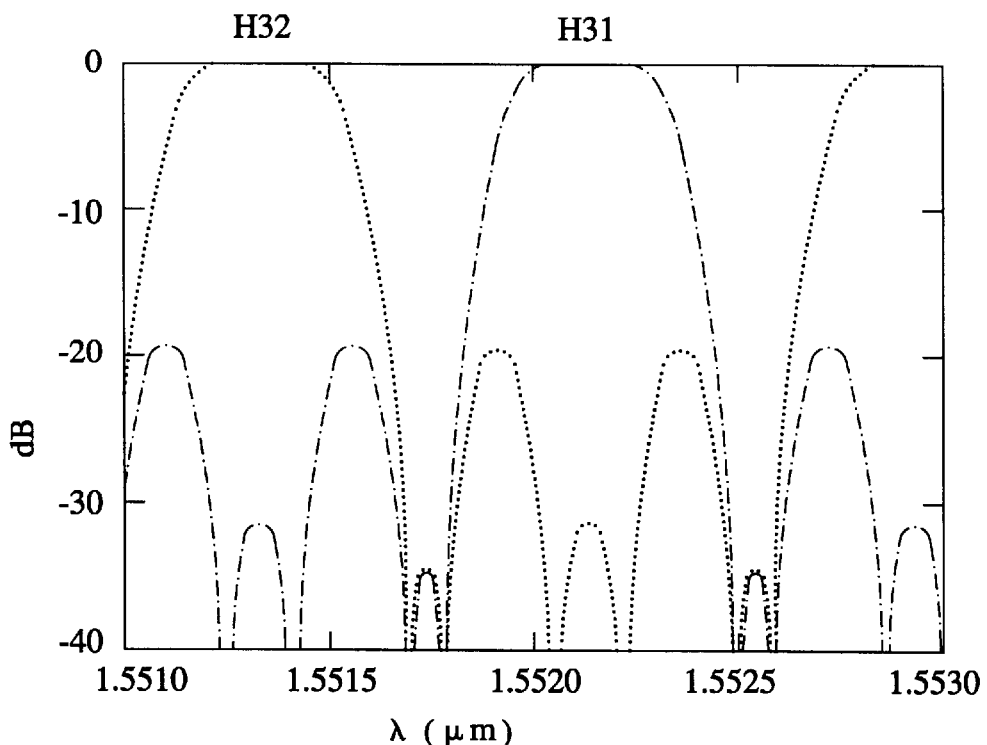
FIG. 14a illustrate the output spectrums of the de-interleaver shown in FIG. 13.
Figure 14B:
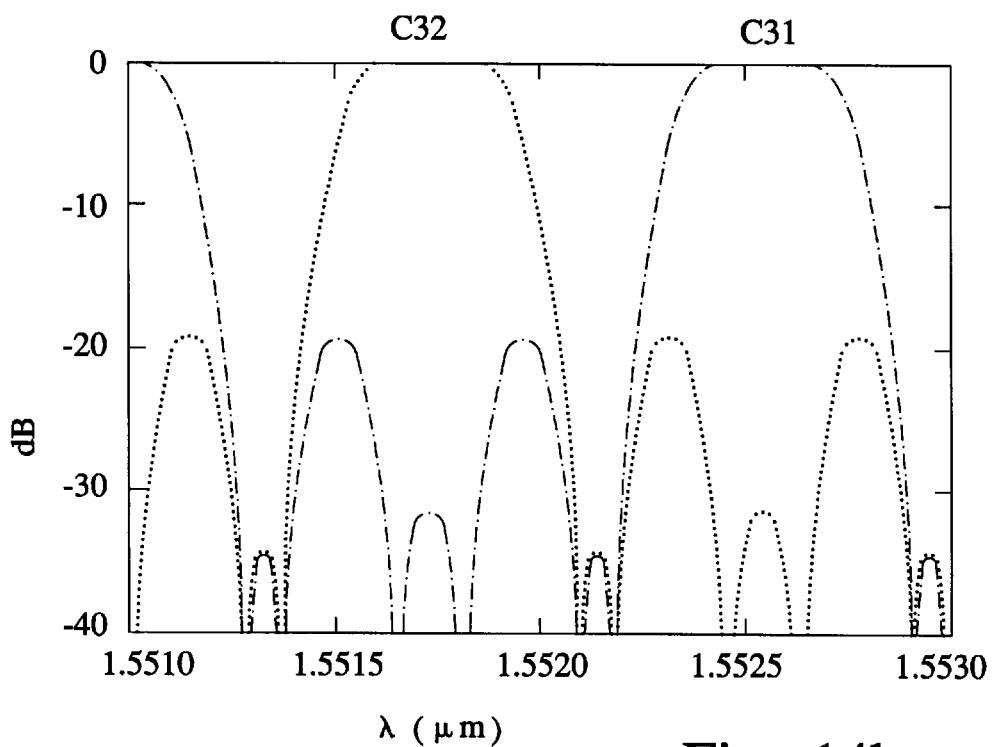
FIG. 14b illustrate the output spectrums of the de-interleaver shown in FIG. 13.

FIG. 14a and FIG. 14b illustrate the output spectrums of the 50/200 GHz de-interleaver with dispersion compensation shown in FIG. 13. FIGS. 14a and 14b show that the 0.5 dB passband width is 35 GHz and −25 dB isolation stopband widths for 50 GHz and 100 GHz adjacent channels are 18.8 and 36 GHz, respectively. In FIG. 14a and FIG. 14b, channel "H31" ($\lambda$=1552.12 nm) is odd channel for 50 and 100 GHz channel spacing, channel "H32" ($\lambda$=1551.32 nm) is odd channel for 50 GHz channel spacing and is even channel for 100 GHz channel spacing. Channel "C31" ($\lambda$=1552.52 nm) is even channel for 50 GHz channel spacing and odd channel for 100 GHz channel spacing, and channel "C32" ($\lambda$=1551.72 nm) is even channel for 50 and 100 GHz channel spacing.

FIG. 14a shows the odd channels for 50 GHz spacing, channel "H31" is output by the first output beam 302 in FIG. 13 and channel "H32" is output by the second output beam 303. FIG. 14b shows the even channels for 50 GHz spacing, channel "C31" is output by the third output beam 304 in FIG. 13 and channel "C32" is output by the fourth output beam 305. Without dispersion compensation, the absolute value of dispersion is larger than 45 ps/nm in the 20 GHz passband, and this value is less than 10 ps/nm after dispersion compensation.

Comparing with a device by cascading one 50/100 GHz and two 100/200 GHZ de-interleavers as shown in FIG. 2, the 50/200 GHz de-interleaver of FIG. 13 has following advantages:

less components;

the cost of the single device may be less than the half cost of cascading three devices; and the insertion loss may be reduced by one third.

The area occupied by a cascaded device (FIG. 2) in a system is much larger than the area occupied by the single devices as shown in FIG. 13, may be ten times larger. Because the fibers which connect individual devices can not be bent too much, larger space is needed. In this embodiment, the −25 dB isolation stop-band width for 50 GHz adjacent channels is only 18.8 GHz which is too narrow for some applications in DWDM. It is also desired to substantially broaden the −25 dB isolation stop-band width for 50 GHz adjacent channels.

The present application is dedicated to create a unique design of an optical S/2S de-interleaver, e.g. S=50 GHz, with high isolation and dispersion compensation that uses only one polarization interferometer. At the same time, this unique design make it possible to create a S/4S de-interleaver, e.g. S=50 GHz, with sufficient −25 dB isolation stop-band width for DWDM applications.

Figure 15:
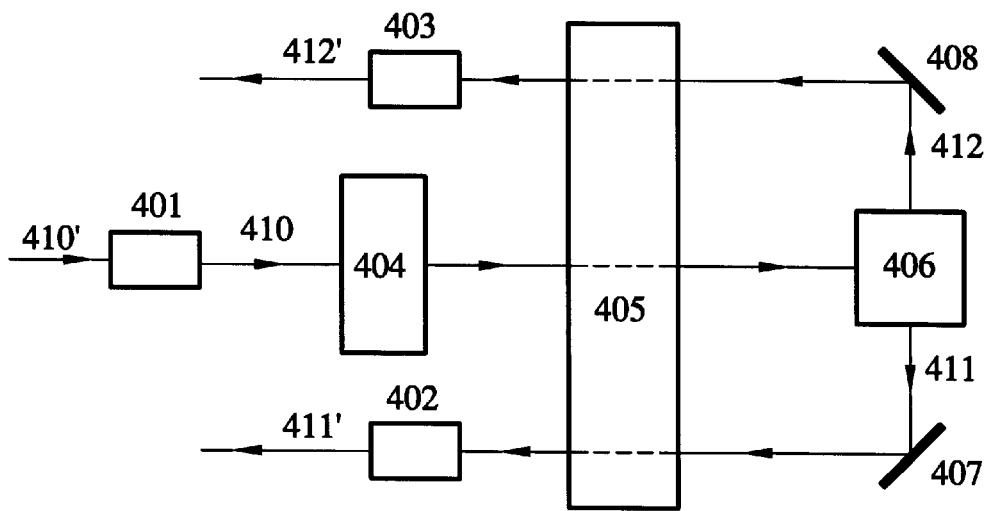
FIG. 15 is a schematic illustration of a S/2S optical de-interleaver of the present invention which uses only one polarization interferometer.

FIG. 15 is a schematic illustration of a S/2S optical de-interleaver 400 with high isolation and dispersion compensation of the present invention which uses only one polarization interferometer 405. In FIG. 15, the optical de-interleaver 400 has a first port 401 for introducing an input beam 410' of odd and even channel signals having channel spacing S and providing two linearly polarized beams 410 of odd and even channel signals. The two linearly polarized beams 410 go through an optical dispersion compensator 404, a polarization interferometer 405 and are split by a polarization beam splitter 406 into two linearly polarized beams 411 of odd channel signals having channel spacing 2S and two linearly polarized beams 412 of even channel signals having channel spacing 2S. The two linearly polarized beams 411 of odd channel signals are reflected by a first reflector 407, go through the polarization interferometer 405 again and are received by a second port 402 to provide a first output beam 411'. The two linearly polarized beams 412 of even channel signals are reflected by a second reflector 408, go through the polarization interferometer 405 again and are received by a third port 403 to provide a second output beam 412'. In FIG. 15, the free spectral range of the polarization interferometer 405 is 2S.

In FIG. 15, the optical dispersion compensator 404 can be a Gires-Tournois Interferometer (GTI). The polarization interferometer 405 has a Gires-Tournois Interferometer, an internal phase element and an external phase element (see also FIG. 5). The internal phase element can be selected from a group consisting of quarter wave-plate and 45 degree Faraday rotator. The external phase element can be selected from a group consisting of one-eighth wave-plate and 22.5 degree Faraday rotator. The channel spacing S is selected from a group consisting of 12.5 GHz, 25 GHz, 50 GHz and 100 GHz.

FIG. 16 shows an embodiment of a 50/100 GHz de-interleaver 500 with high isolation and dispersion compensation of the present invention, in which only one polarization interferometer and two polarization beam splitters are used. In FIG. 16 the thin lines stand for two substantially parallel beams with same polarizations. The input beam 501 carries a set of optical signals of even and odd channels having channel spacing 50 GHz. The input beam 501 passes through a first port 504 and become two vertically polarized beams 530, 530' which are reflected by a first polarization beam splitter 505 to a quarter-wave plate 506 which transforms the linearly polarized beams 530, 530' to circularly polarized beams 531, 531'. The circularly polarized beams 531, 531' travel to a dispersion compensator 507 which changes phase of signals by $\psi_c(\lambda)$ (see equation (6)).

The beams reflected from the dispersion compensator 507 pass through the quarter wave plate 506 again which transforms the circularly polarized beams to the linearly polarized beams, finally, the vertically polarized beams 530, 530' become the horizontally polarized beams 532, 532'. Both horizontally polarized beams 532, 532' pass through the first polarization beam splitter 505, a first half-wave plate 508, a first garnet 509, and a second polarization beam splitter 510 into a polarization interferometer 511.

The beams 533, 533' of odd channels reflected back from the polarization interferometer 511 pass through the second polarization beam splitter 510 to the first garnet 509. The first garnet 509 rotates the horizontally polarized beams 533, 533' a 45 degree and the first half-wave plate 508 rotates them another 45 degree. The horizontally polarized beams 533, 533' become vertically polarized beams 534, 534' which are reflected by the first polarization beam splitter 505 to a first 180° beam reflector 516 (right angle folding prism), which in turn reflects the beams 534, 534' back to the first polarization beam splitter 505 as vertically polarized beams 535, 535'. The vertically polarized beams 535, 535' are reflected by the first polarization beam splitter 505 to a third half-wave plate 514 which rotates the vertically polarized beams 535, 535' into horizontally polarized beams 536, 536'. The horizontally polarized beams 536, 536' pass through the second polarization beam splitter 510, a second half-wave plate 513, a second garnet 512 to the polarization interferometer 511 again. The horizontally polarized beams 537, 537' of odd channels reflected back from the polarization interferometer 511 (secondly filtered) pass through the second garnet 512, the second half-wave plate 513, and become beams 538, 538' with vertical polarization.

The vertically polarized beams 538, 538' are reflected by the second polarization beam splitter 510 and received by a second port 551 to provide a first output beam 502 of odd channel signals with channel spacing 100 GHz. The expression of the amplitude and phase of the output light beam 502 is the equation (10).

The beams 540, 540' of even channels reflected by the polarization interferometer 511 and the second polarization beam splitter 510 travel to a second 180° beam reflector 517 which reflects the beams 540, 540' back to the second polarization beam splitter 510, and are reflected by the second polarization beam splitter 510 again to the polarization interferometer 511. The horizontally polarized beams 541, 541' of even channels reflected back from the polarization interferometer 511 (secondly filtered) pass through the second polarization beam splitter 510, to a fourth half-wave plate 515 which rotates the horizontally polarized beams 541, 541' to the vertically polarized beams 542, 542'. The vertically polarized beams 542, 542' reflected by the first polarization beam splitter 505 are received by a third port 552 to provide a second output beam 503 of even channel signals with channel spacing 100 GHz. The expression of the amplitude and phase of the output light beam 503 is the equation (11).

FIG. 17a shows the detailed view of the first port 504 in FIG. 16. In FIG. 17a, a first collimator 561 collimates the input beam 501. A first Walk-off crystal 562 separates the collimated input beam 501' from the first collimator 561 into a vertically polarized beam 530 and a horizontally polarized beam 530". A fifth half-wave plate 563 rotates the horizontally polarized beam 530" to the vertically polarized beam 530'.

FIG. 17b shows the detailed view of the second port 551 in FIG. 16. In FIG. 17b, a sixth half-wave plate 566 rotates the vertically polarized beam 538' to a horizontally polarized beam 538". A second Walk-off crystal 565 combines the vertically polarized beam 538 and a horizontally polarized beam 538" into a first combined output beam 502'. The first combined output beam 502' passes through a second collimator 564 into the first output beam 502.

FIG. 17c shows the detailed view of the second port 552 in

FIG. 16. In FIG. 17c, a seventh half-wave plate 569 rotates the vertically polarized beam 542' to a horizontally polarized beam 542". A third Walk-off crystal 568 combines the vertically polarized beam 542 and a horizontally polarized beam 542" into a second combined output beam 503'. The second combined output beam 503' passes through a second collimator 567 into the second output beam 503.

The output spectrum of odd and even channels of this embodiment is the same as those shown in FIG. 11. The difference between this embodiment shown in FIG. 16 and the embodiment shown in FIG. 10 is that two cheaper prisms (516, 517) in the present invention (FIG. 16) replace two expensive polarization interferometers in FIG. 10. One polarization interferometer 511 in FIG. 16 is used repeatedly three times.

In FIG. 16, the optical 50/100 GHz de-interleaver 500 (S=50 GHz) has a 0.5 dB passband width of about 30 GHz and a −25 dB isolation stopband width of about 30 GHz. The absolute dispersion value is less than 24 ps/nm.

It is apparent to those skilled in the art that the embodiment of the 50/100 GHz de-interleaver of the present invention shown in FIG. 16 can be easily adjusted, e.g. changing the rotating direction of the first garnet 509, and be used inversely as an optical 100/50 GHz interleaver with high isolation and dispersion compensation.

FIG. 18 is a schematic illustration of a S/4S optical de-interleaver 600 with high isolation and dispersion compensation of the present invention. In FIG. 18, the S/4S optical de-interleaver 600 has a first port 601 for introducing an input beam 620' of odd-odd, odd-even, even-odd and even-even channel signals having channel spacing S and providing two linearly polarized beams 620 of odd-odd, odd-even, even-odd and even-even channel signals. The two linearly polarized beams 620 go through an optical dispersion compensator 602, a first polarization interferometer 603 and are split by a first polarization beam splitter 604 into two linearly polarized beams 621 of odd-odd and odd-even channel signals having channel spacing 2S and two linearly polarized beams 622 of even-odd and even-even channel signals having channel spacing 2S.

The two linearly polarized beams 621 of odd-odd and odd-even channel signals are reflected by a first reflector 605, go through the first polarization interferometer 603 again and go through a second polarization interferometer 606. The two linearly polarized beams 622 of even-odd and even-even channel signals are reflected by a second reflector 607, go through the first polarization interferometer 603 again and go through a third polarization interferometer 608.

A second polarization beam splitter 609 splits the two linearly polarized beams 623 of odd-odd and odd-even channel signals after going through the second polarization interferometer 606 into two linearly polarized beams 625 of odd-odd channel signals having channel spacing 4S and two linearly polarized beams 626 of odd-even channel signals having channel spacing 4S. The two linearly polarized beams 625 are received by a second port 611 to provide a first output beam 625' of odd-odd channel signals having channel spacing 4S. The two linearly polarized beams 626 are received by a third port 612 to provide a second output beam 626' of odd-even channel signals having channel spacing 4S.

A third polarization beam splitter splits the two linearly polarized beams 624 of even-old and even-even channel signals after going through a third polarization interferometer 608 into two linearly polarized beams 627 of even-old channel signals having channel spacing 4S and two linearly polarized beams 628 of even-even channel signals having channel spacing 4S. The two linearly polarized beams 627 are received by a fourth port 613 to provide a third output beam 627' of even-odd channel signals having channel spacing 4S. The two linearly polarized beams 628 are received by a third port 612 to provide a fourth output beam 628' of even-even channel signals having channel spacing 4S.

In FIG. 18, the free spectral range of the first polarization interferometer 603 is 2S and the free spectral ranges of the second and third polarization interferometers 606, 608 are 4S. The optical dispersion compensator 602 can be a Gires-Tournois Interferometer (GTI). Each of the first polarization interferometer 603, the second polarization interferometer 606 and the third polarization interferometer 608 can have a Gires-Tournois Interferometer (GTI). Each of the first polarization interferometer 603, the second polarization interferometer 606 and the third polarization interferometer 608 further has an internal phase element and an external phase element (see also FIG. 5). The internal phase element can be selected from a group consisting of quarter wave-plate and 45 degree Faraday rotator. The external phase element can be selected from a group consisting of one-eighth wave-plate and 22.5 degree Faraday rotator. The channel spacing S is selected from a group consisting of 12.5 GHz, 25 GHz and 50 GHz.

FIG. 19 shows an embodiment of a 50/200 GHz de-interleaver 700 with high isolation and dispersion compensation of the present invention. In FIG. 19, the thin lines stand for two substantially parallel light beams with same polarizations for simplifying the explanations.

The input beam 701 carries a set of optical signals of odd-odd, odd-even, even-odd and even-even channels having channel spacing 50 GHz. The input beam 701 passes through a first port 704 and become two vertically polarized beams 730, 730' which are reflected by a first polarization beam splitter 705 to a quarter-wave plate 706 which transforms the linearly polarized beams 730, 730' to circularly polarized beams 731, 731'. The circularly polarized beams 731, 731' travel to a dispersion compensator 707 which changes phase of signals by $\psi_c(\lambda)$ (see equation (6)).

The beams reflected from the dispersion compensator 707 pass through the quarter wave plate 706 again which transforms the circularly polarized beams to the linearly polarized beams, finally, the vertically polarized beams become the horizontally polarized beams 732, 732'. Both horizontally polarized beams 732, 732' pass through the first polarization beam splitter 705, a first half-wave plate 708, a first garnet 709, and a second polarization beam splitter 710 into a first polarization interferometer 711.

The beams 733, 733' of odd-odd and odd-even channels reflected from the polarization interferometer 711 pass through the second polarization beam splitter 710 to the first garnet 709. The first garnet 709 rotates the horizontally polarized beams 733, 733' a 45 degree and the first half-wave plate 708 rotates them another 45 degree, the vertically polarized beams 734, 734' are reflected by the first polarization beam splitter 705 to a first 180° beam reflector 716 (right angle folding prism) which reflects the beams 734, 734' back to the first polarization beam splitter 705. The vertically polarized beams 735, 735' are reflected by the first polarization beam splitter 705 to a fifth half-wave plate 714 which rotates the vertically polarized beams 735, 735' to the horizontally polarized beams 736, 736', the horizontally polarized beams 736, 736' pass through the second polarization beam splitter 510, a second half-wave plate 713, a second garnet 712 to the polarization interferometer 711 again. The horizontally polarized beams 737, 737' of odd-odd and odd-even channels reflected by the polarization interferometer 711 (secondly filtered) pass through the second garnet 712, the second half-wave plate 713, and become beams 738, 738' with vertical polarization. The vertically polarized beams 738, 738' of odd-odd and odd-even channels with channel spacing 100 GHz are reflected by the second polarization beam splitter 710 and travel to a third half-wave plate 720.

The vertically polarized signals 738, 738' of odd-odd and odd-even channels pass through the third half-wave plates 720 and a third garnet 721 and become beams 759, 759' with horizontal polarization. The horizontally polarized beams 759, 759' pass through a third polarization beam splitter 723 to a second polarization interferometer 724 (100/200 GHz). The horizontally polarized beams 760, 760' of odd-odd channels (channel spacing 200 GHz) reflected by the second polarization interferometer 724 pass through the third polarization beam splitter 723, the third garnet 721, the third half-wave plate 720 and the second polarization beam splitter 710 and become horizontally polarized beams 761, 761' which are received by a second port 780 to provide a first output beam 781 of odd-odd channel signals with channel spacing 200 GHz and high isolation.

The vertically polarized beams 762, 762' of odd-even channels (channel spacing 200 GHz) reflected by the second polarization interferometer 724 are reflected by the third polarization beam splitter 723 and received by a third port 782 to provide a second output beam 783 of odd-even channel signals with channel spacing 200 GHz and high isolation.

The beams 740, 740' of even-odd and even-even channels reflected from the polarization interferometer 711 and the second polarization beam splitter 710 travel to a second 180° beam reflector 717 which reflects the beams 740, 740' back to the second polarization beam splitter 710, and are reflected by the second polarization beam splitter 710 again to the first polarization interferometer 711. The horizontally polarized beams 741, 741' reflected by the polarization interferometer 711 (secondly filtered) pass through the second polarization beam splitter 710, to a sixth half-wave plate 715 which rotates the horizontally polarized beams 741, 741' to the vertically polarized beams 742, 742'. The vertically polarized beams 742, 742' of even-odd and even-even channels with channel spacing 100 GHz are reflected by the first polarization beam splitter 705 and travel to a fourth half-wave plate 725.

The vertically polarized beams 742, 742' of even-odd and even-even channels pass through the fourth half-wave plates 725 and a fourth garnet 726 and become beams 764, 764' with horizontal polarization. The horizontally polarized beams 764, 764' pass through a fourth polarization beam splitter 727 to a third polarization interferometer 728 (100/ 200 GHz). The horizontally polarized beams 765, 765' of even-odd channels (channel spacing 200 GHz) reflected by the third polarization interferometer 728 pass through the fourth polarization beam splitter 727, the fourth garnet 726, the fourth half-wave plate 725 and the first polarization beam splitter 705 and become horizontally polarized beams 766, 766' which are received by a fourth port 784 to provide an third output beam 785 of even-odd channel signals with channel spacing 200 GHz and high isolation.

The vertically polarized beams 767, 767' of even-even channels (channel spacing 200 GHz) reflected by the third polarization interferometer 728 are reflected by the fourth polarization beam splitter 727 and received by a fifth port 786 to provide an output beam 787 of even-even channel signals with channel spacing 200 GHz and high isolation.

Figure 20A:
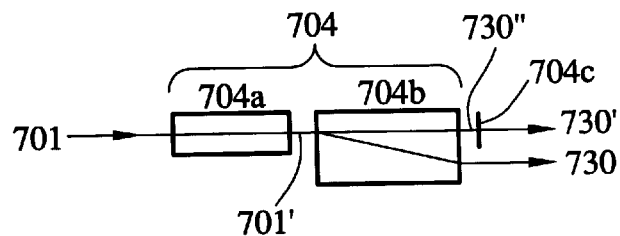

FIG. 20*a* shows the detailed view of the first port 704 in FIG. 19. In FIG. 20*a*, a first collimator 704*a* collimates the input beam 701. A first Walk-off crystal 704*b* separates the collimated input beam 701' from the first collimator 704*a* into a vertically polarized beam 730 and a horizontally polarized beam 730". A seventh half-wave plate 704*c* rotates the horizontally polarized beam 730" to the vertically polarized beam 730'.

Figure 20B:
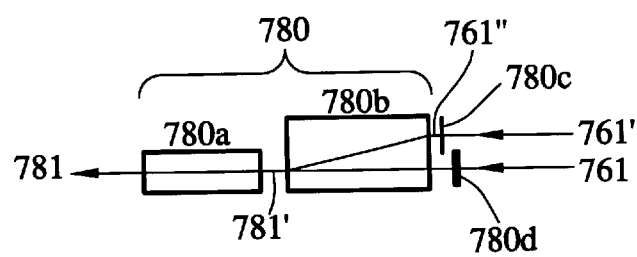

FIG. 20*b* shows the detailed view of the second port 780 in FIG. 19. In FIG. 20*b*, a eighth half-wave plate 780*c* rotates the horizontally polarized beam 761' to a vertically polarized beam 761". A second Walk-off crystal 780*b* combines the horizontally polarized beam 761 and the vertically polarized beam 761" into a first combined output beam 781'. The first combined output beam 781' passes through a second collimator 780*a* into the first output beam 781. A first all-wave plate 780*d* is disposed before the second Walk-off crystal 780*b* to compensate the polarization mode dispersion (PMD) of the beam 761.

Figure 20C:
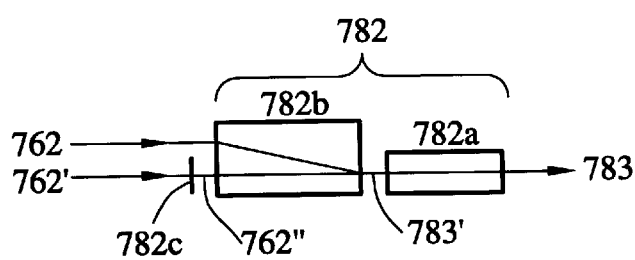

FIG. 20*c* shows the detailed view of the third port 782 in FIG. 19. In FIG. 20*c*, a ninth half-wave plate 782*c* rotates the vertically polarized beam 762' to a horizontally polarized beam 762". A third Walk-off crystal 782*b* combines the vertically polarized beam 762 and the horizontally polarized beam 762" into a second combined output beam 783'. The second combined output beam 783' passes through a third collimator 782*a* into the second output beam 783.

Figure 20D:
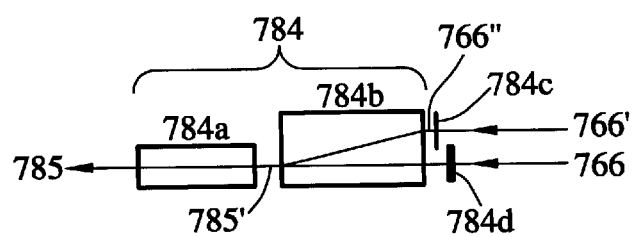

FIG. 20*d* shows the detailed view of the fourth port 784 in FIG. 19. In FIG. 20*d*, a tenth half-wave plate 784*c* rotates the horizontally polarized beam 766' to a vertically polarized beam 766". A fourth Walk-off crystal 784*b* combines the horizontally polarized beam 766 and the vertically polarized beam 766" into a third combined output beam 785'. The third combined output beam 785' passes through a fourth collimator 784*a* into the third output beam 785. A second all-wave plate 784*d* is disposed before the fourth Walk-off crystal 784*b* to compensate the polarization mode dispersion (PMD) of the beam 766.

Figure 20E:
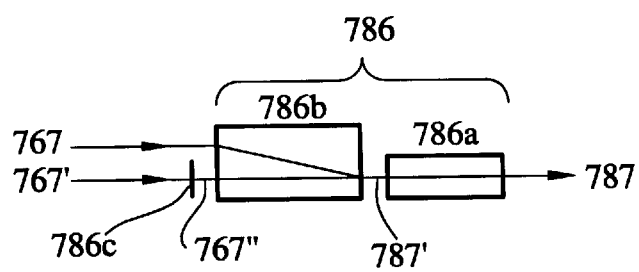

FIG. 20*e* shows the detailed view of the fifth port 786 in FIG. 19. In FIG. 20*e*, an eleventh half-wave plate 786*c* rotates the vertically polarized beam 767' to a horizontally polarized beam 767". A fifth Walk-off crystal 786*b* combines the vertically polarized beam 767 and the horizontally polarized beam 767" into a fourth combined output beam 787'. The fourth combined output beam 787' passes through a fifth collimator 786*a* into the fourth output beam 787.

In FIG. 19, the free spectral range of the first polarization interferometer 711 is 100 GHz and the free spectral ranges of the second and third polarization interferometers 724, 728 are 200 GHz. The optical dispersion compensator 707 can be a Gires-Tournois Interferometer (GTI). Each of the first polarization interferometer 711, the second polarization interferometer 724 and the third polarization interferometer 728 can have a Gires-Tournois Interferometer (GTI). Each of the first polarization interferometer 711, the second polarization interferometer 724 and the third polarization interferometer 728 further has an internal phase element and an external phase element (see also FIG. 5). The internal phase element can be selected from a group consisting of quarter wave-plate and 45 degree Faraday rotator. The external phase element can be selected from a group consisting of one-eighth wave-plate and 22.5 degree Faraday rotator.

FIG. 21a and FIG. 21b illustrate the output spectrum of the 50/200 GHz de-interleaver with high isolation and dispersion compensation as shown in FIG. 19. FIG. 21a and FIG. 21b show that the 0.5 dB passband width is 30 GHz and −25 dB isolation stopband widths for 50 GHz and 100 GHz adjacent channels are 30 and 37.5 GHz, respectively. The absolute dispersion value is less than 24 ps/nm.

It is also apparent to those skilled in the art that the embodiment of the 50/200 GHz de-interleaver of the present invention shown in FIG. 19 can be easily adjusted, e.g. changing the rotating directions of all garnets, and be used inversely as an optical 200/50 GHz interleaver with high isolation and dispersion compensation.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those of skill in the art to which the present invention is directed upon review of the present specification.

What is claimed is:

1. An optical de-interleaver comprising:
   a first port for introducing an input beam of odd-odd, odd-even, even-odd and even-even channel signals having channel spacing S and providing two linearly polarized beams of odd-odd, odd-even, even-odd and even-even channel signals with same polarizations;
   a second port;
   a third port;
   a fourth port;
   a fifth port;
   an optical dispersion compensator;
   a first polarization beam splitter reflecting said two linearly polarized beams of odd-odd, odd-even, even-odd and even-even channel signals to said optical dispersion compensator;
   a first polarization interferometer;
   a second polarization interferometer;
   a third polarization interferometer;
   a second polarization beam splitter, said two linearly polarized beams of odd-odd, odd-even, even-odd and even-even channel signals going through said optical dispersion compensator, passing through said first polarization beam splitter and said second polarization beam splitter, and then going through said first polarization interferometer and being split by said second polarization beam splitter into two linearly polarized beams of odd-odd and odd-even channel signals having channel spacing 2S and two linearly polarized beams of even-odd and even-even channel signals having channel spacing 2S;
   a first reflector, said two linearly polarized beams of odd-odd and odd-even channel signals being reflected by said first polarization beam splitter and said first reflector, being reflected by said first polarization beam splitter again and passing through said second polarization beam splitter and going through said first polarization interferometer again, and then being reflected by said second polarization beam splitter, going through said second polarization interferometer;
   a second reflector, said two linearly polarized beams of even-odd and even-even channel signals being reflected by said second polarization beam splitter and said second reflector, being reflected by said second polarization beam splitter again, going through said first polarization interferometer again, passing through said second polarization beam splitter, and then being reflected by said first polarization beam splitter, and going through said third polarization interferometer;
   a third polarization beam splitter splitting said two linearly polarized beams of odd-odd and odd-even channel signals after going through said second polarization interferometer into two linearly polarized beams of odd-odd channel signals and light beams of odd-even channel signals, said two linearly polarized beams of odd-odd channel signals passing through said second polarization beam splitter and being received by said second port to provide a first output beam of odd-odd channel signals having channel spacing 4S, and said two linearly polarized beams of odd-even channel signals being received by said third port to provide a second output beam of odd-even channel signals having channel spacing 4S; and
   a fourth polarization beam splitter splitting said two linearly polarized beams of even-old and even-even channel signals after going through said third polarization interferometer into two linearly polarized beams of even-old channel signals and two linearly polarized beams of even-even channel signals, said two linearly polarized beams of even-old channel signals passing through said first polarization beam splitter and received by said third port to provide a third output beam of even-old channel signals having channel spacing 4S, said two linearly polarized beams of even-even channel signals being received by said fifth port to provide a fourth output beam of even-even channel signals having channel spacing 4S.

2. The optical de-inteleaver of claim 1, further comprising;
   a first half-wave plate and a first garnet disposed between said first polarization beam splitter and said second polarization beam splitter, said first half-wave plate and said first garnet acting on said two linearly polarized beams of odd-odd, odd-even, even-odd and even-even channel signals and said two linearly polarized beams of odd-even and odd-odd channel signals;
   a second half-wave plate and a second garnet disposed between said second polarization beam splitter and said first polarization interferometer, said second half-wave plate and said second garnet acting on said two linearly polarized beams of odd-even and odd-odd channel signals;
   a third half-wave plate and a third garnet disposed between said second polarization beam splitter and said third polarization beam splitter, said third half-wave plate and said third garnet acting on said two linearly polarized beams of odd-even and odd-odd channel signals;
   a fourth half-wave plate and a fourth garnet disposed between said first polarization beam splitter and said fourth polarization beam splitter, said fourth half-wave plate and said fourth garnet acting on said two linearly polarized beams of even-odd and even-even channel signals;

a fifth half-wave plate disposed between said first polarization beam splitter and said second polarization beam splitter, said fifth half-wave plate acting on said two linearly polarized beams of odd-even and odd-odd channel signals, a sixth half-wave plate disposed between said first polarization beam splitter and said second polarization beam splitter, said sixth half-wave plate acting on said two linearly polarized beams of even-odd and even-even channel signals, and a quarter-wave plate disposed between said optical dispersion compensator and said first polarization beam splitter.

3. The optical de-interleaver of claim 1, wherein said optical dispersion compensator comprises a Gires-Tournois Interferometer.

4. The optical de-interleaver of claim 1, wherein each of said first polarization interferometer, said second polarization interferometer and said third polarization interferometer comprises a Gires-Tournois Interferometer.

5. The optical de-interleaver of claim 1, wherein said S is selected from a group consisting of 12.5 GHz, 25 GHz and 50 GHz.

6. The optical de-interleaver of claim 1, wherein each of said first reflector and said second reflector comprises a right angle folding prism.

7. The optical de-interleaver of claim 1, wherein said first port comprises a first collimator for collimating said input beam into a collimated input beam, and a first walk-off crystal and a seventh half-wave plate for separating said collimated input beam into said two linearly polarized beams of odd-odd, odd-even, even-odd and even-even channels having channel spacing S.

8. The optical de-interleaver of claim 1, wherein said second port comprises a eighth half-wave plate and a second walk-off crystal for receiving and combining said two linearly polarized beams of odd-odd channels into a first combined output beam of odd-odd channels, and a second collimator for converging said first combined output beam of odd-odd channels into said first output beam of odd-odd channels having channel spacing 4S.

9. The optical de-interleaver of claim 8, wherein said second port further comprises a first all-wave plate for compensating polarization mode dispersion.

10. The optical de-interleaver of claim 1, wherein said third port comprises a ninth half-wave plate and a third walk-off crystal for receiving and combining said two linearly polarized beams of odd-even channels into a second combined output beam of odd-even channels, and a third collimator for converging said second combined output beam of odd-even channels into said second output beam of odd-even channels having channel spacing 4S.

11. The optical de-interleaver of claim 1, wherein said fourth port comprises a tenth half-wave plate and a third walk-off crystal for receiving and combining said two linearly polarized beams of even-odd channels into a third combined output beam of even-odd channels, and a fourth collimator for converging said third combined output beam of even-odd channels into said third output beam of even-odd channels having channel spacing 4S.

12. The optical de-interleaver of claim 11, wherein said fourth port further comprises a second all-wave plate for compensating polarization mode dispersion.

13. The optical de-interleaver of claim 1, wherein said fifth port comprises a eleventh half-wave plate and a fourth walk-off crystal for receiving and combining said two linearly polarized beams of even-even channels into a fourth combined output beam of even-even channels, and a fifth collimator for converging said fourth combined output beam of even-even channels into said fourth output beam of even-even channels having channel spacing 4S.

14. The optical de-interleaver of claim 1, wherein said S is 50 GHz, said optical de-interleaver has a 0.5 dB passband width of about 30 GHz and a −25 dB isolation stopband width of about 30 GHz.

15. The optical de-interleaver of claim 1, wherein said S is 50 GHz, said optical de-interleaver has an absolute dispersion value of less than 24 ps/nm.

* * * * *